(12) United States Patent
Hargroder

(10) Patent No.: US 8,554,584 B2
(45) Date of Patent: *Oct. 8, 2013

(54) INTERACTIVE CREDENTIAL SYSTEM AND METHOD

(75) Inventor: Dwayne Paul Hargroder, Opelousas, LA (US)

(73) Assignee: Hargroder Companies, Inc, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/890,514

(22) Filed: Sep. 24, 2010

(65) Prior Publication Data

US 2011/0016056 A1 Jan. 20, 2011

Related U.S. Application Data

(63) Continuation-in-part of application No. 12/850,367, filed on Aug. 4, 2010, which is a continuation-in-part of application No. 12/213,468, filed on Jun. 19, 2008, now abandoned, which is a continuation-in-part of application No. 12/081,130, filed on Apr. 10, 2008, now abandoned, which is a continuation-in-part of application No. 11/710,885, filed on Feb. 26, 2007, now abandoned, which is a continuation-in-part of application No. 11/480,679, filed on Jul. 3, 2006, now abandoned.

(51) Int. Cl.
*G06Q 40/00* (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | |
|---|---|---|---|
| 5,117,353 | A | 5/1992 | Stipanovich et al. |
| 5,164,897 | A | 11/1992 | Clark et al. |
| 5,197,004 | A | 3/1993 | Sobotka et al. |
| 5,416,694 | A | 5/1995 | Parrish et al. |
| 6,157,808 | A | 12/2000 | Hollingsworth |
| 6,266,659 | B1 | 7/2001 | Nadkarni |
| 6,289,340 | B1 | 9/2001 | Puram et al. |
| 6,385,620 | B1 | 5/2002 | Kurzius et al. |
| 6,658,400 | B2 | 12/2003 | Perell et al. |
| 6,681,223 | B1 | 1/2004 | Sundaresan |
| 6,714,944 | B1 | 3/2004 | Shapiro et al. |
| 6,873,964 | B1 | 3/2005 | Williams et al. |
| 6,901,301 | B2 | 5/2005 | Bradshaw |
| 2002/0073066 | A1* | 6/2002 | Coutts et al. ...................... 707/1 |
| 2002/0111816 | A1 | 8/2002 | Lortscher et al. |
| 2002/0152098 | A1* | 10/2002 | Evans et al. ...................... 705/4 |
| 2003/0101080 | A1 | 5/2003 | Zizzamia et al. |
| 2006/0053038 | A1* | 3/2006 | Warren et al. ...................... 705/4 |
| 2006/0095304 | A1 | 5/2006 | Madison et al. |
| 2006/0106651 | A1 | 5/2006 | Madison et al. |

\* cited by examiner

*Primary Examiner* — Thomas M Hammond, III
(74) *Attorney, Agent, or Firm* — Richard C. Litman

(57) ABSTRACT

The interactive credential system and method has a database containing employee-employer-applicant surveyed information, industry specific criteria, such as insurance loss history and account performance, an authorization code for authorizing access to the database and a control device, operatively associated with the database, for presenting weighted scores. The system further includes a surveyed party processor operatively associated with the control device, and wherein the surveyed party processor is capable of transmitting the authorization code to view the surveyed information. The system also has a participant processor that is capable of requesting authorization to download the employee-employer-applicant information, including weighted scores computed from the system's algorithms processed from industry specific parameters.

8 Claims, 16 Drawing Sheets

Evalscore®

RiskScore Employee Profile
Evalscore® ID  HJ8239396BBD            *1202*

EMPLOYER:  Ace Plumbing, Inc.
2120 Third Ave.
Baton Rouge, Louisiana 70835

Employee: John Smith SS# 438-34-XXXX

| Employer | Insurance Co | Policy Period | Policy Number |
|---|---|---|---|
| Ace Plumbing, Inc. | LWCC | 01-01-2007 to 12-31-2007 | WC12764-1 |
| Ace Plumbing, Inc. | LWCC | 01-01-2006 to 12-31-2006 | WC12764-2 |
| Ace Plumbing, Inc. | LWCC | 01-01-2005 to 12-31-2005 | WC12764-3 |
| ABC Plumbing, Inc. | Hartford | 01-01-2004 to 12-31-2004 | WC279571-1 |
| ABC Plumbing, Inc. | Hartford | 01-01-2003 to 12-31-2003 | WC279571-2 |

5-Year RiskScore Summary Totals

| Employer | Insurance Co | Policy Period | Policy Number |
|---|---|---|---|
| Ace Plumbing, Inc. | LWCC | 01-01-2007 to 12-31-2007 | WC12764-1 |
| Ace Plumbing, Inc. | LWCC | 01-01-2006 to 12-31-2006 | WC12764-2 |
| Ace Plumbing, Inc. | LWCC | 01-01-2005 to 12-31-2005 | WC12764-3 |
| ABC Plumbing, Inc. | Hartford | 01-01-2004 to 12-31-2004 | WC279598-1 |
| ABC Plumbing, Inc. | Hartford | 01-01-2003 to 12-31-2003 | WC279598-2 |

*Claim Information
Date of Loss 03-15-2007
Description:
Employee fell down while loading equipment and twisted ankle.

a = Employee Annualized Payroll
b = Employers Workers Compensation Insurance per $100.00 of Payroll for Specific Employee Classification
c = Employees Annualized Workers Compensation Premium Assessment to Employer
d = Employee Pro Rata Earned Premium for current Policy Period Based Upon Written Premium [C]
e = Employee Total Earned Premium from 01-01-2003 to 06-15-2007
f = Employee Total Incurred Losses from 01-01-2003 to 06-15-2007
g = Employee Current Year Loss Adjustment Expenses
h = Employee Incurred Losses-Current Policy Period
i = Subrogation
j = Employee Total Loss Adjustment expenses 06-15-2003 to 06-15-2007
k = RiskScore

Fig. 12A          1200

Date 06-15-2007    11:15 am CST

5-Year Historical RiskScore = 801 [k]

| Written | Earned | Incurred | Paid | Reserve | Subro | Adjust | L/R % | |
|---|---|---|---|---|---|---|---|---|
| 1958 | 885 [d] | 1700*[h] | 1700 | | | 475 [g] | 2.45 | RiskScore = 220 |
| 1814 | 1814 | | | | | | | |
| 1790 | 1790 | | | | | | | 1216 |
| 1870 | 1870 | | | | | | | |
| <u>1828</u> | <u>1828</u> | | | | | | | |
| 12770 | 11290 [e] | 1700 [f] [b] | 1700 | [i] [a] | | 475 [j] | .1926 | RiskScore = 801 [c] |

| Classifications | Payroll | Rate/100 | Premium | Employee Payroll | Premium |
|---|---|---|---|---|---|
| | 1208 | 1204 | | 1206 | 1212 | 1214 |
| Plumbing NOC | 213218 | 4.35 | 9275 | 45000 | 1958 |
| Plumbing NOC | 210000 | 4.18 | 8875 | 43500 | 1814 |
| Plumbing NOC | 215000 | 4.26 | 9175 | 42000 | 1790 |
| Plumbing NOC | 235318 | 4.25 | 10001 | 44000 | 1870 |
| Plumbing NOC | 232352 | 4.25 | 9875 | 43000 | 1828 |

1210

Current Year RiskScore = [(h + g) - i/d]
5-Year Historical RiskScore = [(f + j) - i/e]
RiskScore = 850 - [[lr*100]*2.57]
[lr = loss ratio]

Fig. 12B  1200

INTERACTIVE CREDENTIAL SYSTEM AND METHOD

CROSS-REFERENCE TO RELATED APPLICATIONS

This application is a continuation-in-part of U.S. patent application Ser. No. 12/850,367, filed on Aug. 4, 2010, which is a continuation-in-part of U.S. patent application Ser. No. 12/213,468, filed on Jun. 19, 2008 now abandoned, which is a continuation-in-part of U.S. patent application Ser. No. 12/081,130, filed on Apr. 10, 2008 now abandoned, which is a continuation-in-part of U.S. patent application Ser. No. 11/710,885, filed on Feb. 26, 2007 (now abandoned), which is a continuation-in-part of U.S. patent application Ser. No. 11/480,679, filed on Jul. 3, 2006 (now abandoned).

BACKGROUND OF THE INVENTION

1. Field of the Invention

The present invention relates to the information technology industry for the systematic implementation of resource management using employee-employer-applicant dynamics and participant surveys, and particularly to an interactive credential system and method incorporating industry specific parameters for evaluation and subsequent scoring with emphasis on a proprietary method of employment, insurance and finance information processing.

2. Description of the Related Art

As the insurance industry has incorporated the use of Medical Information Bureaus (MIB's) for Life and Health Insurance underwriting and Motor Vehicle Reports (MVR's) and claims information provided by "CLUE" for property and casualty insurance risks, this invention, in one embodiment, is designed to launch a web-based system to provide real time employee credentials for employment and insurance underwriting by full disclosure of prior work history, performance and specialized credentials while eliminating insurance and financial information processing deficiencies that currently exist in the prior art.

The system herein disclosed consists of an interactive web-based information inference engine for the management of employee credentials as well as prior work history and performance as reported by industry sources. The system may include a certification program to award all companies that incorporate the system for the maintenance of current employees, new hires, as well as the real time processing of pertinent information critical to industries such as insurance and finance. The system allows for a second tier of performance information on businesses in order to provide consumers with real time access to full disclosure of businesses' past performance and/or their aggregated analysis of insurance loss history performance, customer satisfaction and weighted scoring. The system may include the launching of a secure business web site through the incorporation of password protection and personal pin numbers to insure the privacy of each applicant's scoring and the restriction of use by unauthorized personnel. Such a system of industry specific criteria evaluated, scored and monitored in real time through electronic alerts does not exist in the prior art.

In another embodiment, an interactive credential system and method that utilizes a survey system is also disclosed. Survey information of a surveyed party is compiled from various respondents. The survey information is used by participants of the system, as fully disclosed in the description of the preferred embodiments.

Therefore, there is a need for an on-demand systematic real time performance scoring method as a management tool in order to improve the underwriting process of insurance policies, credit provisions, as well as the management of employees with industry specific credentials. By virtue of the disclosed system, member companies will experience economic efficiencies from the reduction of Human Resource activity for new hire verification, reference checks on discharged employees, and insurance cost savings by the improved risk management practices through behavior modification and improved safety provisions by the incorporation of real time loss control alerts provided by program implementation. Additionally, as the insurance industry has incorporated multiple tools for underwriting consideration, the current industry methods fall short of real time insurance performance analysis and measurable non-discriminatory indexes, therefore, there is a need for a single interactive credential system and method, wherein a participant can be surveyed by various respondents and scored by real time insurance loss history performance by line of coverage based upon historical earned premium vs. claims experience with a separate assessment and scoring model for insurance performance indicators such as insurance payment history, non-renewals, cancellations, misrepresentations, etc. with weighted results of scores and sub scores calculated and made available to selected participants.

Prior to the establishment of credit bureaus, many businesses were forced to verify credit ratings on prospective clients, prior to the granting of credit, based upon the disclosure of the prospective client's credit facilities and payment history. This effort was time consuming and costly to the prospective creditors, as each disclosed creditor would have to be contacted manually for a "credit rating" or payment history. Thus, if your prospective client had established credit with SEARS, JC PENNY, Joe's Hardware, VISA, etc., it was imperative that each individual creditor disclose individual ratings and payment history in order for new credit facilities to properly underwrite the credit risk.

This process was costly, as it required additional credit personnel in order to gather the credit information to establish the credit worthiness of the applicant and the establishment of a new line of credit. Many credit facilities had limited hours of operation for this specific tasks and restricted many retailers from establishing credit for point of sale transactions.

After undergoing a financial revolution, whereby credit information was consolidated by a third party into a clearing house, scored and then made available to prospective credit facilities for a nominal charge with the touch of a keystroke, many of these problems were alleviated.

As the present insurance industry shares many of the deficiencies of the early years of credit bureaus, a new business model and method is required to similarly revolutionize the commercial and personal insurance industry, while also contributing to an enhanced risk management culture.

Currently the commercial insurance industry is impaired by underwriting inefficiencies, due to the lack of access to complete real time insurance loss history available at point of sale to be utilized in the evaluation of risk in the underwriting process, much like the credit industry of the past. Currently, the industry typically requires the assembly of prior loss experience of up to five years of previous coverages provided by each insurance company for each policy period by line of coverage for underwriting consideration. Although each company could make electronic data available to insured's agent of record, it would not benefit other agents attempting to quote risk and the process would still be time consuming for the retrieval of each detailed policy history, but most importantly, would lack the detail of automation and the aggregated analysis of all prior years as requested by prospective insurers for trending. Example, if the insured has been insured by 3 insurance companies over the past 5 years, the information retrieved by company A would not reflect information for company B and C. Therefore, there is a need for the collection, aggregation, evaluation, assessment and subsequent scoring of the present method.

Many states have enacted laws that require insurance companies to provide the policy holder with their loss experience with a request properly executed with name, policy number, policy period, etc. Many states have enacted laws specifying a maximum number of days that the insurance company has to comply. As an example, Louisiana law provides that an insurance company must provide this information within 30 days of a duly executed request. Therefore, U.S. commercial insurance policy holders are disadvantaged by the process of choosing new insurers due to the time delay and the effort to seek their previous loss runs from several companies within the typical 5 year previous history which is resolved by the real time process of this method.

Insurance companies can hold this provision as leverage against a current policyholder, as some will "hold out" until the final deadline in order to prevent their insured from seeking other competitive bids. Further, many insurance companies will not quote a new risk without a completed application along with the required loss runs attached in order to properly evaluate the risk. Also, insurers are disadvantaged by the absence of real time numerical assessments of loss history and account performance and lack format continuity provided by current "static" information which requires the constant request of updated history, as the loss history may change for years after receipt due to long tail liability claims, delays in the legal system and litigation time frame due to docket congestion.

John Doe, as an example, may have a loss recorded on his loss run with a large "reserve" posted and expected to pay, only to have the courts award a judgment more or less than the reserve, and the loss runs will be adjusted to reflect an increase or decrease in renewal premium based on the action. Therefore, updated loss runs are necessary for accurate underwriting and, each year, insurance companies request updated information to determine eligibility or appropriate pricing. Existing experience modifiers available today for general liability, commercial auto and workers compensation insurance provided by bureau associations fall short of real time data as they reflect a time when loss history worksheets had to be assembled after each policy period and mailed to the associations to be placed in line for processing with other risk of the same classification, therefore, a policy written in 2006 uses a 2005 modifier that is based on 2004 and earlier information, for example, therefore this method continues to provide data that is a staggering minimum of 12 months old but only reflects actual reported loss information on each risk as compared to others in the same classification. With the technological advances of the present method, emods could be replaced with real time scores for a more accurate display of historical performance with real time monitoring provisions enhancing decision-making processes for loss control/claims prevention/safety divisions or special interest parties, such as commercial lenders, that could utilize such data. The disclosed method proposes a global authorization executed by insured at point of sale by affidavit or part of the standard application in compliance with FCRA policy, much like credit application disclosures for the release of credit, satisfying the request by all previous insurers for the release of specific time frame loss history and account performance data for electronic distribution to the present system for loss history aggregation and real time scoring with separate scoring assessments of insurance premium payment performance indicators for future loss predictability while making available premium and loss statistics by classification for real time modifiers and future rate promulgation.

Many states provide a minimum number of days required for an insurance company to issue non-renewal or cancellation of a poor performing risk and therefore, up to date real time insurance loss history, insurance account performance information as well as real time motor vehicle report modification downloads, as provided herein, through electronic alerts are required to reduce insurance company expense ratios through automated underwriting/policy issuance, improved operational efficiencies, and a reduction in claim frequency and severity resulting in lower premiums for the policyholders. These needs, and many others, will be met by the following described system.

SUMMARY OF THE INVENTION

In a first preferred embodiment, the system will provide baseline credentials containing industry specific criteria with automatic updating of time sensitive information. Certifications and continuing education requirements will be updated instantaneously and reflect status of such requirements. The system can provide for automatic downloads with certification agencies and specific industries in order to receive real time information electronically in an approved format. It should be understood that data is collected and updated in real time in the preferred embodiment. However, alternatively, the data, or personal information, may be collected and/or updated at any time or based upon a user-selectable set of times or at a user-selectable frequency.

A sample illustrative list of agencies that can communicate data includes: the State Real Estate Commission, Insurance Companies, State Department of Motor Vehicles/Public Safety or other Driving Record providers, Mortgage Lenders, Legal and Bar Associations, State Licensing Departments such as State Board of Nursing, and other approved certification agencies. The collected information will be processed by a proprietary algorithm with subsequent scoring available to all member companies through client authorization much like credit reports.

The database of employment/applicant records and industry specific criteria such as insurance scores, etc. will then be available for a nominal fee to authorized users. All employees in the system shall have identification cards with specified identification numbers that can be made available to the human resources departments to pull employment records within seconds. The system creates an employment database that will receive all information regarding that applicant's profession, duration of employment, compensation indicators, special achievements/certifications, employment evaluations, employment safety performance, industry specific criteria and the current status of each. A real time resume that has been evaluated through a series of algorithmic computations and scored for numeric assessment of groups and sub groups constantly updated in real time and monitored through electronic alerts is possible with the teachings of this invention.

In this first embodiment, a provision can be included to better educate consumers about artesian contractors, like carpenters, roofers, electricians, etc. Unlike prior art that encompasses "external" factors for contractor scoring, this method incorporates "internal" provisions of real time insurance loss history performance disclosure including consumer valuation/complaint provisions and electronic alerts to Special Interest Parties such as insurance companies, general contractors monitoring sub-contractors, License and Permit sections, State Licensure Departments, etc. These members could have performance scores available to customers through proper authorization prior to work engagement as scored by this system based upon a contractor's prior claim performance as reported by previous insurers and customer satisfaction results evaluated by premium size, policy duration, and complaint filings in order for full disclosure of job performance.

Therefore, small contractors will be based upon the same criteria as large contractors adjusted by premium size and specific rating indicators such as loss ratios, rate per thousand, etc. Larger revenue results in greater exposure, which, in turn, results in a larger premium. As an example: Contractor A has a $50,000.00 annual premium/12 months/3 complaints. Contractor B has a $5,000.00 annual premium/12 months/3 complaints. Contractor A has 10 times the revenue/premium and, therefore, the applicable score for this component could be 10 times better than that of Contractor B after the adjustment of rating basis. These complaint filings are in the form of a complaint similar to a complaint filed on an insurance company with the department of insurance, however, unlike the present method, prior methods have failed to provide performance disclosure on individual insureds based upon these parameters, and further fail to provide consumer participation in the evaluation process, which enhances contractor accountability and the disclosure of fraud and abuse.

In a second preferred embodiment, an interactive credential system is disclosed. The system comprises a database containing employee information, authorization means for authorizing access to the database and control means, operatively associated with the database, for presenting the employee information in a first format. The employee information is processed through an algorithm utilizing employment dynamics as well as industry specific scoring assessments such as insurance and financial indicators in order to compute an employer-employee-applicant weighted score. The interactive system provides for an authorization code for authorizing access to the database and control device, operatively associated with the database, in order for disclosure of score presentation. The system further includes an employee processor operatively associated with the control means, and wherein the employee processor is capable of transmitting authorization to view the employee information.

In this second embodiment, the system further comprises an employer processor in communication with the authorization means, and wherein the employer processor is capable of requesting authorization to download the employee information. The control means may contain means for requiring that the employer request include payment of the request fee and means for requiring that the employee authorization include payment of the request fee. In the most preferred embodiment, the first format of the employee information includes a weighted score performed by algorithm. The employee information may consist of health/drug testing information and/or employment screen information, education information, employment safety performance, employment evaluations, insurance information, criminal information, and/or professional certification information, and industry specific scoring.

A method of providing employee information is also disclosed. The method comprises storing employee information on a database, such as employment performance evaluations and/or employment safety performance transmitting authorization to view the employee information via an employee processor operatively associated with a control means, and authenticating and authorizing third parties access to the database. The method may further include presenting the employee information in a first format via the control means, and wherein the control means is operatively associated with the database.

The method may further comprise communicating an employer processor with the control means, and requesting authorization to download the employee information with the employer processor. In one embodiment, the step of requesting authorization to download employee information includes paying a request fee by the employer in order to view the employee information. Additionally, the step of transmitting authorization to make available employee information via an employee user processor may include paying a user fee by the employee in order to post the employee information to the database.

In a third embodiment, which is the most preferred embodiment of this disclosure, a method of providing survey information of a surveyed party is disclosed. The method comprises storing the survey information on a database, transmitting authorization to view the information via a surveyed party processor operatively associated with a control means, authenticating and authorizing third parties access to said database, and presenting the survey information in a first format via the control means, and wherein the control means is operatively associated with the database. The method further comprises communicating a participant processor with the control means and requesting authorization to download said survey information with the participant processor.

In one preferred embodiment, the step of requesting authorization to download the survey information includes paying a request fee by the participant in order to view the survey information. Also, the step of transmitting authorization to make available survey information via the surveyed party's processor includes paying a user fee by the surveyed party in order to post the surveyed party's information to the database. Additionally, the step of presenting the survey information in a first format includes utilizing an algorithm to calculate a weighted score of the survey information. The survey information is selected from the group consisting of a financial score, an academic score, an employment score, a character score, a medical score, a professional credential score, a reference score, a military score, a legal score or an insurance score. The method may also include transmitting an alert based on a predetermined criteria selected from the survey information. The participant may be selected from the group consisting of bankers, insurance companies, lenders, employers, and court systems.

In yet another most preferred embodiment, an interactive credential system is disclosed, wherein the system comprises a database comprising survey information of a surveyed party, authorization means for authorizing access to the database, and control means, operatively associated with the database, for presenting the survey information in a first format. This system also includes a survey party processor operatively associated with the control means, and wherein the survey party processor is capable of transmitting authorization to view the survey information, means for generating an alert when the survey information changes based on predetermined criteria, and means for transmitting the alert (or "EVALSCORE® A.L.E.R.T.") to participants in the system.

An advantage of the present method is that companies would finally have an accountability program for the management of their employees and new hires with full disclosure of numerical assessments of performance by the EVALSCORE® EMPLOYMENT PERFORMANCE INDEX® (or "EPI") or "RiskScore" (as will be described in detail below). Another advantage is that workers will have to be accountable in order to maintain adequate weighted scores, which will contribute to enhanced job performance. Such accountability may be used in the workplace for behavior modification of employees, or may be used in other settings for similar behavioral modification purposes.

Yet another advantage is that probation periods will be available for individuals that have experienced hard luck situations and have the opportunity to improve their scores. Another advantage is that companies could use these scores for merit pay and the incentive of good performers. Yet another advantage is that it is possible that companies that maintain a "threshold or average" employment of weighted scores of some predetermined level could receive special recognition and could be entitled to premium credits on large insurance programs. Also, these performance scores will be beneficial to companies being bought and sold as real time disclosure of these criteria will expedite and validate due diligence requirements.

Still yet another advantage is that employers will experience a reduced workload by not having to ever give a reference on an employee, and instead interested parties with proper authorization can log-on and download the appropriate file. Another advantage is that attorneys could use certain authorized information for discovery purposes. For instance, it will be possible to obtain credential information immediately about certifications, safety certification expirations, etc. Also, the system could be used in conjunction with verifying employment information on deadbeat dads eliminating investigative costs to reattach garnishments to new employers.

Another advantage is that financial institutions will reduce loan losses by incorporating an additional underwriting tool that will provide real time employment disclosure, as well as commercial debtor insurance performance evaluation scoring, which will enhance the predictability of an applicant's future ability to pay. This inventive method also provides for these SPECIAL INTEREST PARTIES® to establish user defined real time EVALSCORE® A.L.E.R.T.s of score modifications based upon job performance indicators such as performance improvements, deterioration and/or employment termination.

Another advantage is that insurance cost could be reduced (for employers) by premium credits available for the employment of applicants with a threshold benchmark weighted score, such as an employment workforce with a weighted RiskScore of 500 or greater. This commitment reflects improved applicant hires and less risk for loss. Also, Insurance Companies could provide premium credits to workers compensation insurance policies for participating members due to the loss control alerts provided by this method (or by "EVALSCORE OVERSIGHT®") for the advanced notification of expiring credentials such as safety certifications, industry specific accreditations or other loss control alerts providing cost containment. Yet another advantage to the insurance industry is larger insurance participation as uninsured contractors will be encouraged to participate in the system in order to continue working as customers will demand disclosure of insurance credentials and performance scores for verification.

Still yet another advantage is that hospitals and health care organizations like nursing homes will be protected by tracking all employees' specialized credentials and recurrent training as well as past performance evaluations by prior employment and subsequent numerical score assessment, by the present method. CPR and other specialized credentials will be updated through association-sponsored links, like Red Cross, etc. Also, hospitals that hire agency "pool" nurses for PRN (as needed) shifts will have complete disclosure of score performance of these health care professionals by the numerical assessment of the present system and method. Hospitals and Nursing Homes that are at risk due to poor background information on specific nurses that are sent at the last minute to simply cover nurse-patient ratios through agency pools will benefit from this method by real time disclosure of prior job performance and specialized credentials prior to work engagement with EVALSCORE® A.L.E.R.T. monitoring of critical score modifications protecting health care organizations and health care recipients.

Yet another advantage is that commercial entities will be able to protect themselves from the expiration of industry specific criteria such as CDL expirations for commercial trucking firms and will have a management tool for improved information disclosure on new hires, contract drivers and lease operations though score disclosure of past performance and real time EVALSCORE® A.L.E.R.T.s for score modifications that will assist the Federal Transportation Risk Management oversight initiatives, such as the Comprehensive Safety Analysis "CSA 2010". The energy sector contains several industry specific training programs for various disciplines and the weighted score will become a source of acknowledgment and verification of completion by data links to these specific industry criteria with monitoring features providing protection to SPECIAL INTEREST PARTIES®, such as workers compensation insurance companies, OSHA, ISO, MMS, etc. from the expiration of industry specific criteria crucial to safety/loss control requirements. Real time full disclosure will be very important to cyclical industries, which have been known to hire large numbers of employees in a short period of time and lack the manpower for comprehensive evaluations. The weighted score used in this invention will aid these cyclical industries with staffing by real time full disclosure and score assessment of prior work experience, certifications and achievements.

Another advantage is that the system will assist employees to be better employees in order to maintain their score and achieve compensation incentives/promotions for enhanced work performance. Yet another advantage is that the system will assist employers, businesses and independent contractors to be better businesses, as they will be subject to full disclosure of performance. An applicant can use the World Wide Web, a wireless device or call a telephone number with proper pin identification and obtain information regarding businesses.

A feature of the present invention is that the system allows for a one-stop shop for recordation of employee history, industry specific criteria, subsequent performance scoring and real time monitoring. Another feature is good performers can be recognized quickly and rewarded, while poor performers will not. Another feature is that incentive pay will induce employees to achieve better scores. Yet another feature is that it is possible that employees with good weighted performance scores and marginal credit scores will have the opportunity for credit accommodation, due to employment disclosure.

Another feature is that operational efficiencies will be experienced for all member companies with the reduction of human resource labor through the incorporation of automation and instantaneous file updating of time sensitive information for minute-to-minute accuracy. Yet another feature is that an applicant can use the system as an updated resume. From the base line, all information will be updated instantaneously for real time accuracy. When a request exists for a resume, the applicant can reference the system. Once the applicant provides the personal identification code, access will be granted.

Another feature is that employer special achievement awards will be credited for enhancement of weighted scores, likewise, complaints filed against the employer will be harmful. As we have experienced the fragmentation of the present industry survey system without any meaningful consumer interpretation, this method seeks to achieve score standardization among all industries with consumer access to real time full disclosure.

An advantage of the third embodiment, which is the most preferred embodiment of this disclosure, includes protecting consumers from poor performing businesses. Another advantage is that the system has a component that allows for consumer evaluation and complaint processing of poor performance. Still yet another advantage is that the consumer can participate in the scoring of employers.

Another advantage is that the system protects vendors from poor performing relationships and provides for vendor evaluation component. Vendors could establish benchmark scores as criteria for vendor list participation. Yet another advantage is that the most preferred embodiment of this disclosure allows for employee participation in the evaluation of the employer. This participation allows for constructive information on improving workplace environment, conditions, etc.

Another advantage is that the system allows a means for prospective employees to analyze the employer by using the rating generated by the survey performance of existing employees of their employer. Still yet another advantage is that the process acknowledges specific industry associations to participate in the evaluation of members through evaluation surveys. Yet another advantage of this most preferred embodiment, the process allows for special accreditation programs such as ISO (International Organization for Standardization) for the energy sector and Joint Commission Accreditation for the Health Care Industry to participate in the evaluation process based upon annual survey data and contributes to the specially calculated and weighted score.

A feature of the third and most preferred embodiment is that parents and guardians will be able to rate/evaluate teachers by personal experience to provide disclosure for others making choices for their children. This process will aid teacher performance, as they will have an incentive to achieve satisfactory measurement. Another feature of the most preferred embodiment is that clients of professionals will have access to professional insurance scores based upon real time insurance loss history performance and consumer satisfaction/dissatisfaction as provided by customer surveys for a quantified measurement rather than the reliance of word of mouth recommendations for specific professions. Therefore, the consumer will finally have recourse on poor performance relationships without litigation as a sole remedy.

It should be understood that the present system and method are not limited to the insurance industry, but may be used in any field or industry in which an individual must be evaluated based upon personal information, past performance, credit scores, etc. For example, employers worldwide lack objective performance data on employees, which has resulted in the recent application of "credit" underwriting for the predictability of future employment performance. These employer-accessible "credit" reports are more restrictive in content than the traditional credit report utilized in the credit underwriting industry, and many consumer advocate groups are opposed to the employer-based credit report, due to the possible discriminatory applications. Thus, the present method may further be used to provide an objective employment tool that will serve as a risk management component, aiding both employers and employees in achieving a reduction in claim frequency and severity, thus enhancing our risk management culture.

Similar to the EVALSCORE®, as described above, a weighted employment score (or "RiskScore") may be generated. The employee "RiskScore" is a critical marker for safety measurement and a granular diagnostic tool for employers to isolate poor performers and increase safety education programs. RiskScore may be used to assist OSHA in improving loss time accidents by requiring additional safety/educational programs for all employees who fail to maintain a required "RiskScore" benchmark threshold.

For example, if an employee classification requires an annual certification and/or education renewal, but the employee fails to maintain the required RiskScore threshold for the classification, then he or she could be required to adhere to tighter standards, such as semi-annually, quarterly or monthly reviews for improving employee results, employer performance and insurance company loss ratios, thus contributing to a reduction in insurance premiums through enhanced safety provisions.

BRIEF DESCRIPTION OF THE DRAWINGS

FIGS. 12A and 12B illustrate an exemplary evaluation report generated by an alternative embodiment of the interactive credential system and method according to the present invention.

DETAILED DESCRIPTION OF THE PREFERRED EMBODIMENTS

The system and method disclosed herein consists of an interactive web-based information inference engine for the management of employee-employer-applicant credentials and industry specific criteria as well as prior work history and performance as reported by member resources. The site will assist employers in the management of their most important asset, their employees, as well as provide the public with full disclosure of employer's performance based upon insurance experience and participant surveys in order to protect the consumer from fraud and abuse. The created database collects employer credentials and insurance loss history and performance indicators for the application of employer performance base scoring. The system may incorporate employee/employer dynamics as well as the management of industry specific requirements, such as continuing education requirements, CPR certification for the medical industry, safety training for the energy sector, recurrent training for pilots, etc.

Figure 1:
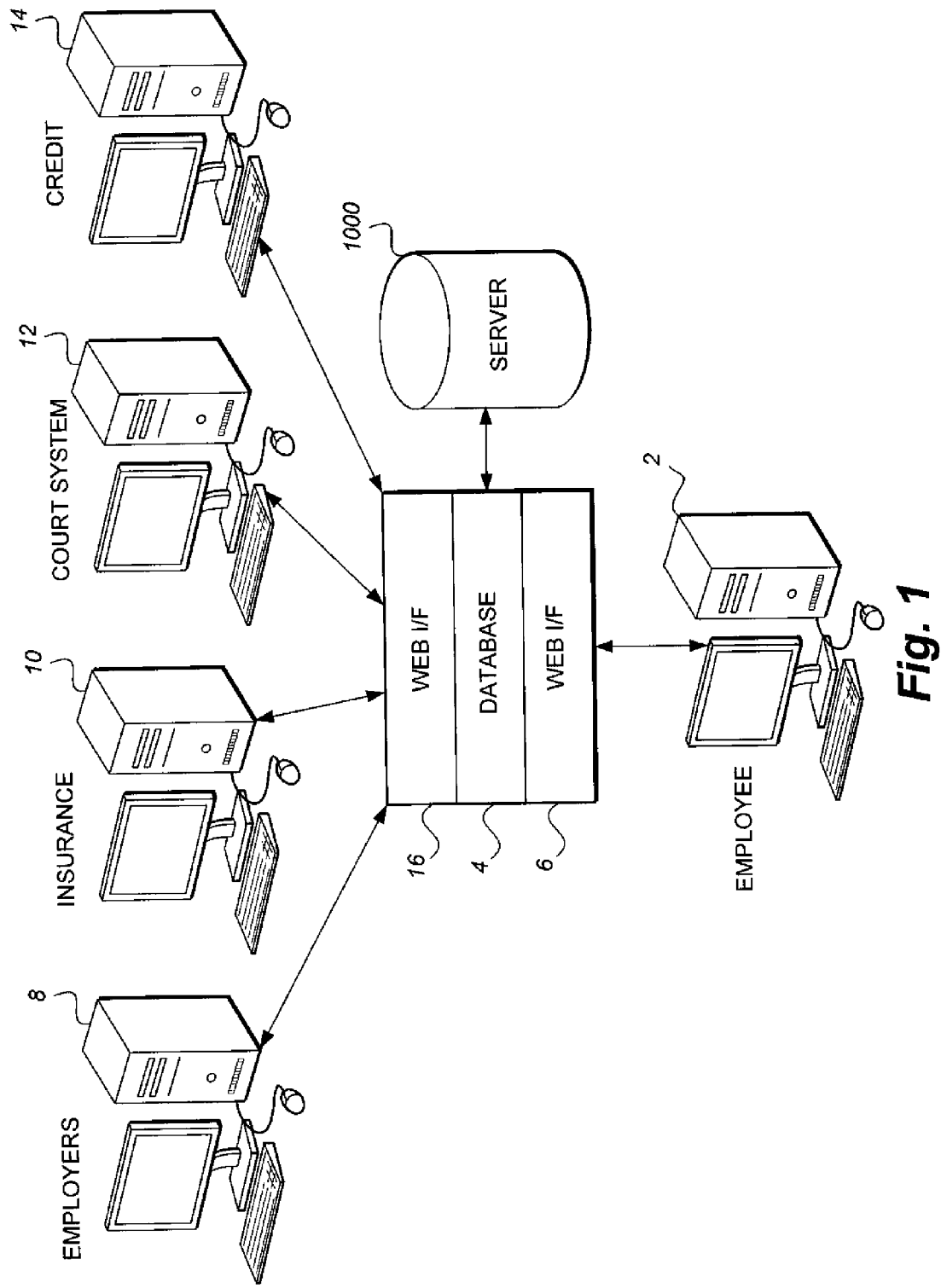
FIG. 1 is a block diagram depicting a first embodiment of an interactive credential system according to the present invention.

Referring now to FIG. 1, a block diagram depicting a first embodiment of the present system will now be described. As shown in FIG. 1, an employee 2 would communicate with the database 4. In the most preferred embodiment, the employee 2 has an employee computer, also referred to as a user processor. The employee computer has means for communication with the Internet and the worldwide web, such as a modem or any other suitable type of network interface. It should be understood that the various networked systems described herein may interface with one another via any suitable type of network, including local area networks (LANs) or wide area networks (WANs), such as the Internet.

As per the teachings of the system, the database 4 contains the web interface means 6 so that the employee computer can communicate with the database. The employee computer may communicate (e.g. via wireless transmission) data and information, including authorization to obtain data from various third party content custodians, as will be more fully explained below. The employee computer may also authorize payment of any fees required for use of the system.

FIG. 1 also depicts several entities that may provide information to the database 4 about the employee. For instance, employers may provide information to the database. Hence, employers 8 can provide this information to the database. FIG. 1 also depicts an insurance entity 10 that provides data for the database 4, a court system entity 12 that provides data for the database, and a credit entity 14 that provides data for the database. It should be understood that this listing of entities is illustrative only. In the most preferred embodiment, the employer entity 8, insurance entity 10, court system 12 and credit entity 14 will communicate with the database 4 via the Internet and worldwide web, as shown by the web interface 16, where the web interface 16 is operatively associated with the database 4. In this way, various entities can communicate data about an employee once the employee has submitted the proper authorization.

Figure 11:
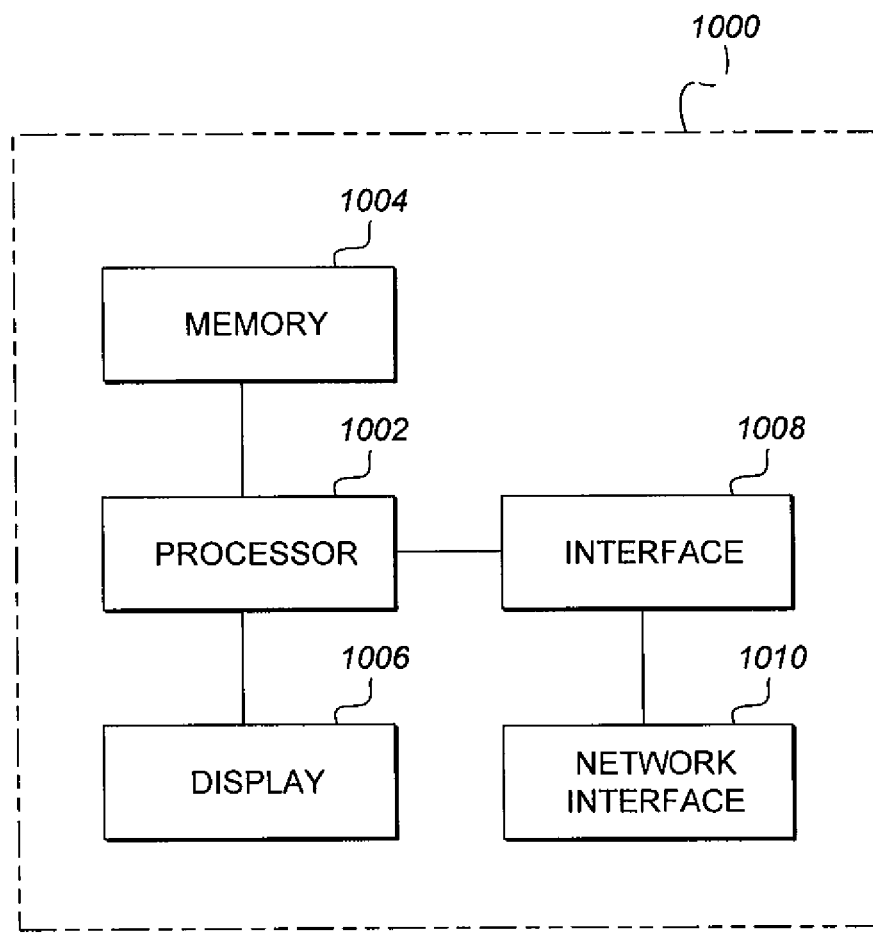
FIG. 11 is a block diagram illustrating an overview of a server of the interactive credential system according to the present invention.

FIG. 11 diagrammatically illustrates system components associated with server 1000. It should be understood that the generalized system 1000 may represent a stand-alone computer, computer terminal, portable computing device, networked computer or computer terminal, or networked portable device. Data may be entered into the system 1000 by a user via any suitable type of user interface 1008, such as a keyboard or the like, and may be stored in computer readable memory 1004, which may be any suitable type of computer readable and programmable memory. Database 4 is stored in computer readable memory 1004. It should be understood that interface 1008 may include a user interface located at, or in communication with, server 1000 for direct data entry, or may further include a network interface 1010 (which includes or consists of web interface 16) for networked communication with employee computer or terminal 2, as well as the other networked computers or computer terminals, such as computers 8, 10, 12 and 14 diagrammatically illustrated in FIG. 1. It should be understood that each computer or computer terminal in communication with server 1000 also includes a memory, processor, display, user interface and network interface, as described herein with reference to server 1000.

Calculations are performed by the processor 1002, which may be any suitable type of computer processor, and may be displayed to the user on the display 1006, which may be any suitable type of computer display. As described above, the system 1000 preferably includes a network interface 1010, such as a modem or the like, allowing the computer to be networked with either a local area network or a wide area network, such as the Internet, for example.

The processor 1002 may be associated with, or incorporated into, any suitable type of computing device, for example, a personal computer or a programmable logic controller. The display 1006, the processor 1002, the memory 1004, and any associated computer readable media are in communication with one another by any suitable type of data bus, as is well known in the art. Additionally, other standard components, such as a printer or the like, may interface with system 1000 via any suitable type of interface.

Examples of computer readable media include a magnetic recording apparatus, an optical disk, a magneto-optical disk, and/or a semiconductor memory (for example, RAM, ROM, etc.). Examples of magnetic recording apparatus that may be used in addition to memory 1004, or in place of memory 1004, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Figure 2:
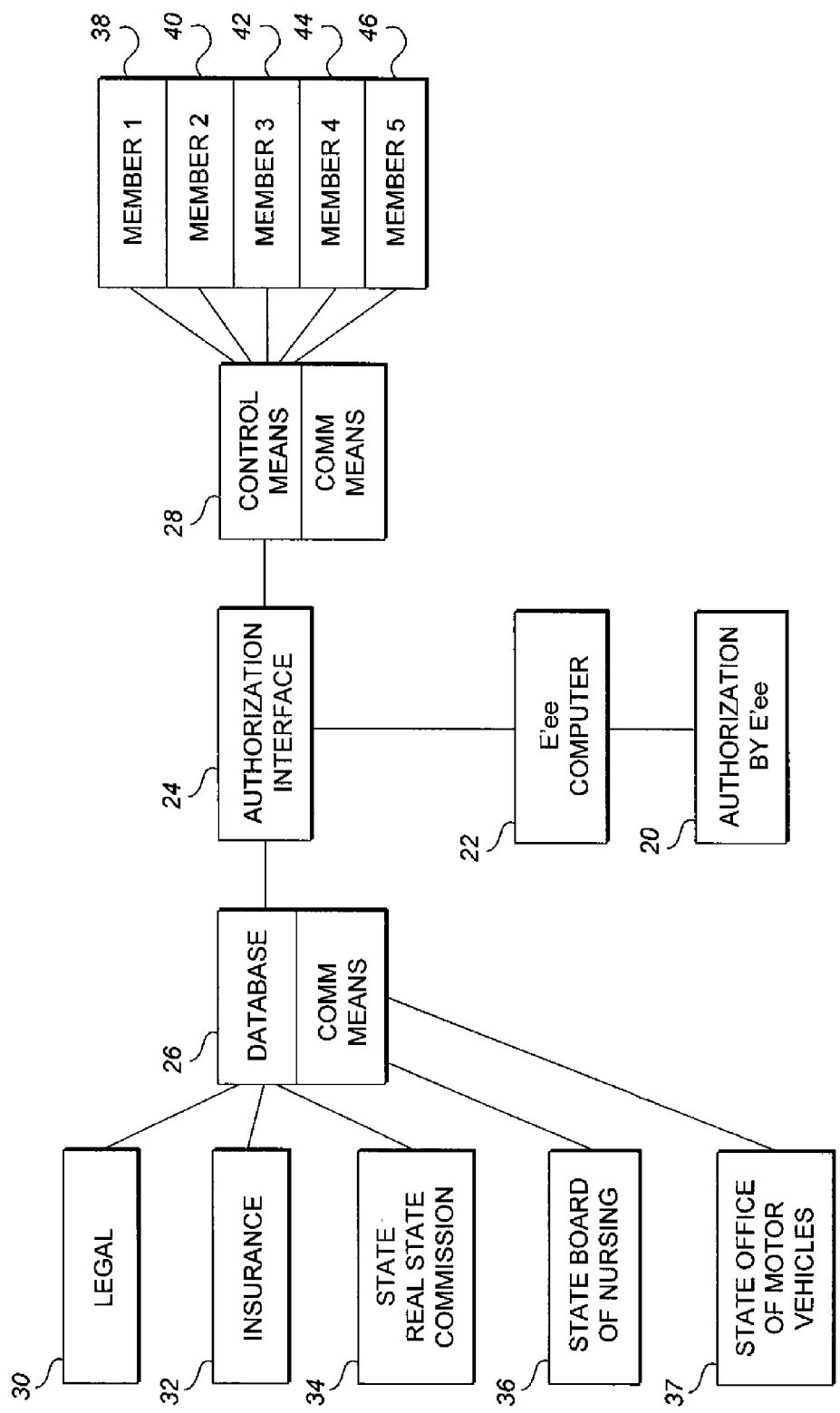
FIG. 2 is a block diagram depicting a second embodiment of an interactive credential system according to the present invention.

Referring now to FIG. 2, a block diagram depicting a second embodiment of the present system will now be described. FIG. 2 is a higher-level diagram from the illustration of FIG. 1. In the embodiment of FIG. 2, an employee gives his authorization 20, and the authorization is sent via the employee computer 22 to authorization interface 24. As depicted, the authorization interface 24 is operatively associated with the database 26 and with the control means 28.

FIG. 2 depicts several entities that will supply data and information to the database 26. More specifically, a legal entity (such as a court system) 30 is shown in communication with the database 26; an insurance entity (such as an insurance company) 32 is shown in communication with the database 26; a state real estate commission 34 is shown in communication with the database 26; a state board of nursing 36 is shown in communication with the database 26; and a state office of motor vehicles 37 (or other driving record resource) is shown in communication with the database 26. The listing of entities is meant to be exemplary and illustrative. The entities 30, 32, 34, and 36 will communicate with the database 26 via the worldwide web in the most preferred embodiment. Database 26 is stored in the computer readable memory 1004 of server 1000, as described above, and each entity described above, as well as the employee, communicate with server 1000 via the network interface associated with each computer or computer terminal, as described above.

Various member entities will be in communication with the database 26 stored in memory 1004. FIG. 2 depicts five member entities, but this listing is illustrative only. In one preferred embodiment, the member entities will pay a required fee to access the database 26 and any proprietary weighting score accomplished according to the teachings of the present invention. Hence, member entity 38 will communicate with the control means 28 (which is preferably processor 1002 of server 1000), which in turn will communicate with the authorization interface to check on authorization, and if there is authorization, then the member 38 will be allowed access to the data and information sought. FIG. 2 further shows the member 40 in communication with the control means, the member 42 in communication with the control means 28, the member 44 in communication with the control means 28, and the member 46 in communication with the control means 28. Members 40, 42, 44, and 46 receive authorization, information and data as mentioned earlier in the discussion of the member 38.

Figure 3:
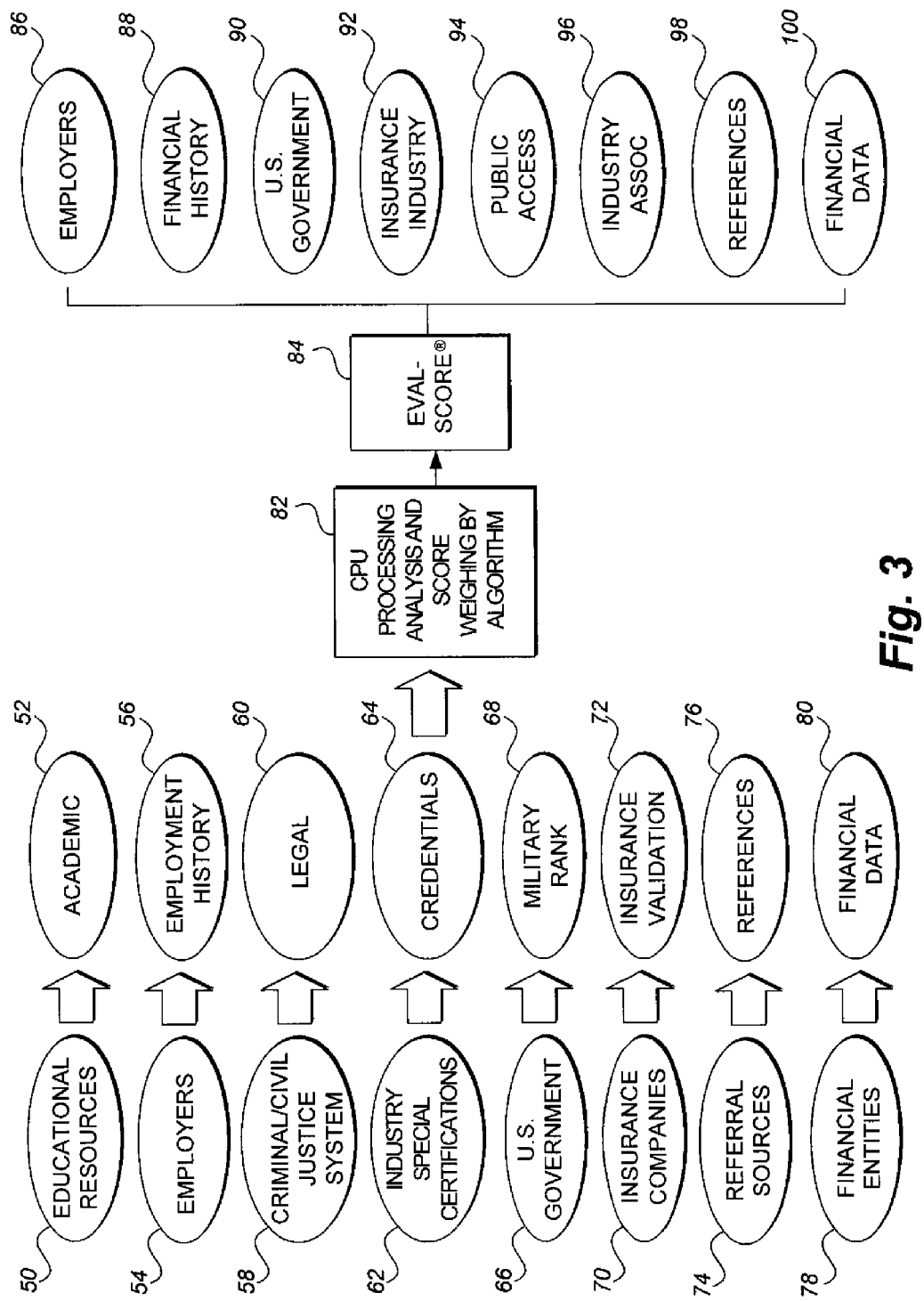
FIG. 3 is a block diagram depicting input factors for analysis and score weighing in an interactive credential system according to the present invention.

FIG. 3 is a flowchart diagram depicting input factors for analysis and score weighing according to the present system. Hence, a source of data can include educational resources 50, where academic records 52, such as high school and college transcripts, can be accessed. Another source of information may be from employers 54, where employment history 56, such as prior jobs and salary, can be accessed. Criminal/civil justice records can be accessed at 58, where legal information 60, such as prior convictions, can be accessed. Another source of data is industry specific certification records 62, where certification information 64, such as professional licenses, can be accessed. Yet another source of data can be U.S. Government information 66, where government information, such as military records 68, can be accessed. Information from insurance companies 70 can be gathered, such as insurance loss history, rating base, classification and premium payment validation 72. Yet another source of information can be referral sources 74, wherein specific references 76 can be accessed. Still yet another source of information is financial entities 78, where financial data 80 can be accessed.

This information is sent to a central processing unit (CPU) 82 for processing, analysis and score weighing in accordance with the teachings of the present invention. CPU 82 may be in communication with processor 1002 of server 1000, or may be all or part of processor 1002, or may operate parallel therewith. The analysis and score weighing is done by algorithm application of industry specific parameters. A weighted score 84 can then be assigned to that person. With the teachings of this invention, it is possible to commercially distribute weighted scores/sub-scores from applicant files of a particular segment (e.g. employment history), (insurance experience), or a group of factors (e.g. academic, military rank, and financial data), or all the factors. The weighted score 84 can then be disseminated as requested from member entities, such as employers 86, a financial entity 88, a government entity 90, an insurance company 92, public access 94, an industry association 96, a specific court 98, or some other entity 100. The listings 86, 88, 90, 92, 94, 96, 98 and 100 are meant to be illustrative only.

Figure 4:
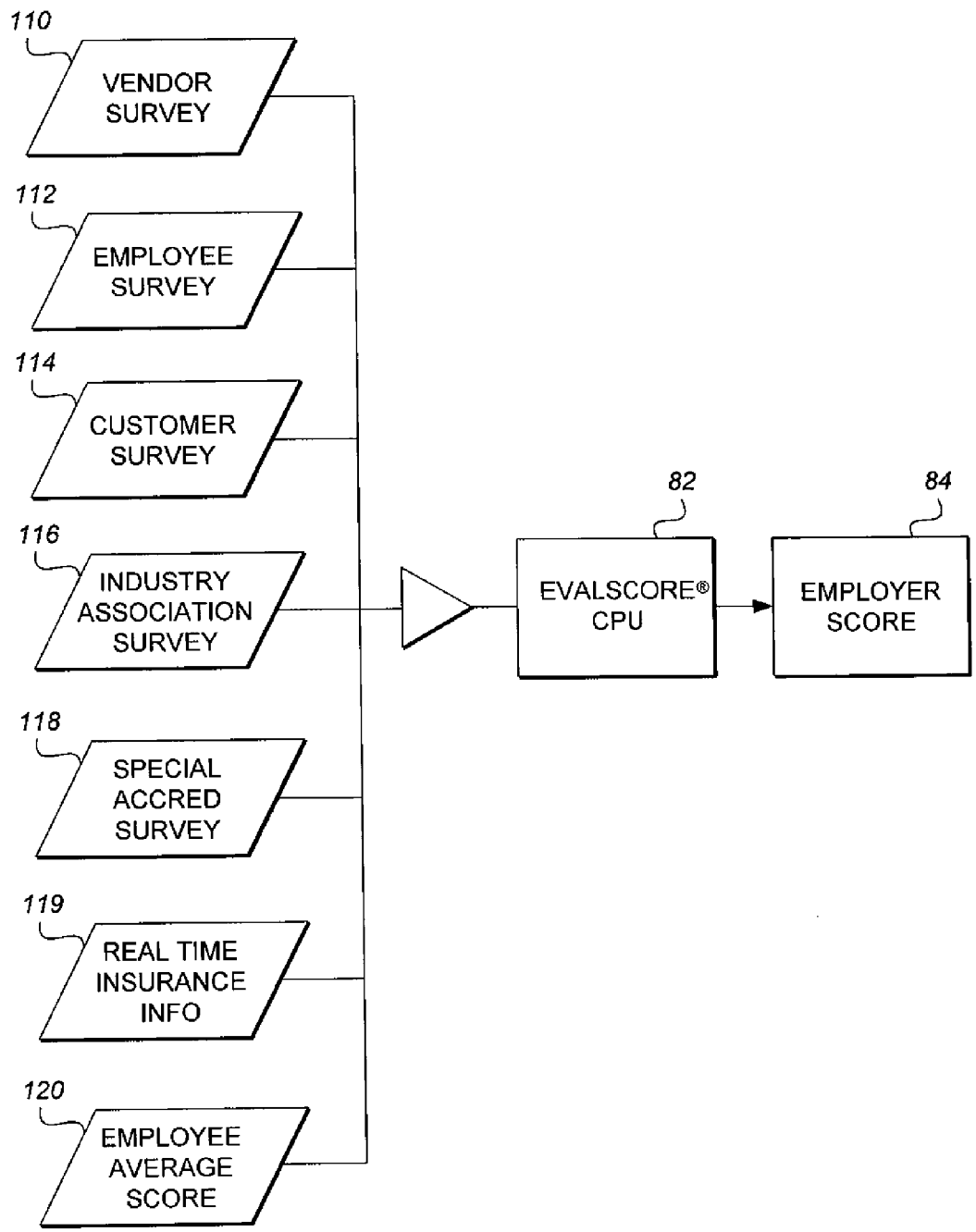
FIG. 4 is a data flowchart of the third embodiment, which is the most preferred embodiment, of an interactive credential system according to the present invention, illustrating the generation of an employer score based on multiple surveys and insurance loss history and account performance.

Referring now to FIG. 4, a data flowchart of the third embodiment, which is the most preferred embodiment of this disclosure, illustrating the generation of an employer score based on multiple surveys and real time insurance performance will now be described. This embodiment allows the employee the ability to participate in the evaluation of the employer. This component will be included in the index criteria along with real time insurance performance scoring, and the evaluation by vendors, by customers, by industry associations, and by special accreditation organizations. The evaluations are calculated and weighted via the algorithm for the actual EVALSCORE® while making available sub-scores for categorical disclosure to interested parties.

As employers under the weighted score system provide input into the overall scoring on each applicant, this preferred system allows for the employee to anonymously rate the employer in an employee satisfaction category to be weighted in the overall evaluation. It has been found that corporations utilize proprietary surveys for employees in order to determine the strengths and weaknesses of each division and recommendations for improvement. However, no recognizable standardization exists in the prior art. With standardization, employers can use these results as compared to other employers to assist in recruiting other competent employees or in advertising to the general public. In the most preferred embodiment, the system can be adapted to include means for parents to evaluate teachers. The process herein disclosed will provide an incentive for teachers to achieve improvement and excellence in the classroom.

FIG. 4 depicts the data that will be entered into the central processor unit 82 that receives and processes the survey data. As noted earlier, like numbers appearing in the various figures refer to like components. More specifically, the survey data includes real time insurance performance and account information 119, a vendor survey 110, an employee survey 112, a customer survey 114, an industry association survey 116, and a special accreditation survey 118. Each survey is a questionnaire designed specifically to ascertain the credentials (i.e., qualifications, skills, competence, etc.) of the surveyed party. FIG. 4 also depicts the employee average score 120 that would be an average score of all employees which is utilized in the computation via the algorithm means, and where the calculation is carried out within the central processor unit 82. The weighted score 84 can then be assigned to that employer. It should be noted that in the below description, the entity that responds to the survey is referred to as the respondent; the party that views and participants in the survey results is referred to as the participant; and the entity being surveyed (i.e., the party being reviewed) is referred to as the surveyed party.

Figure 5:
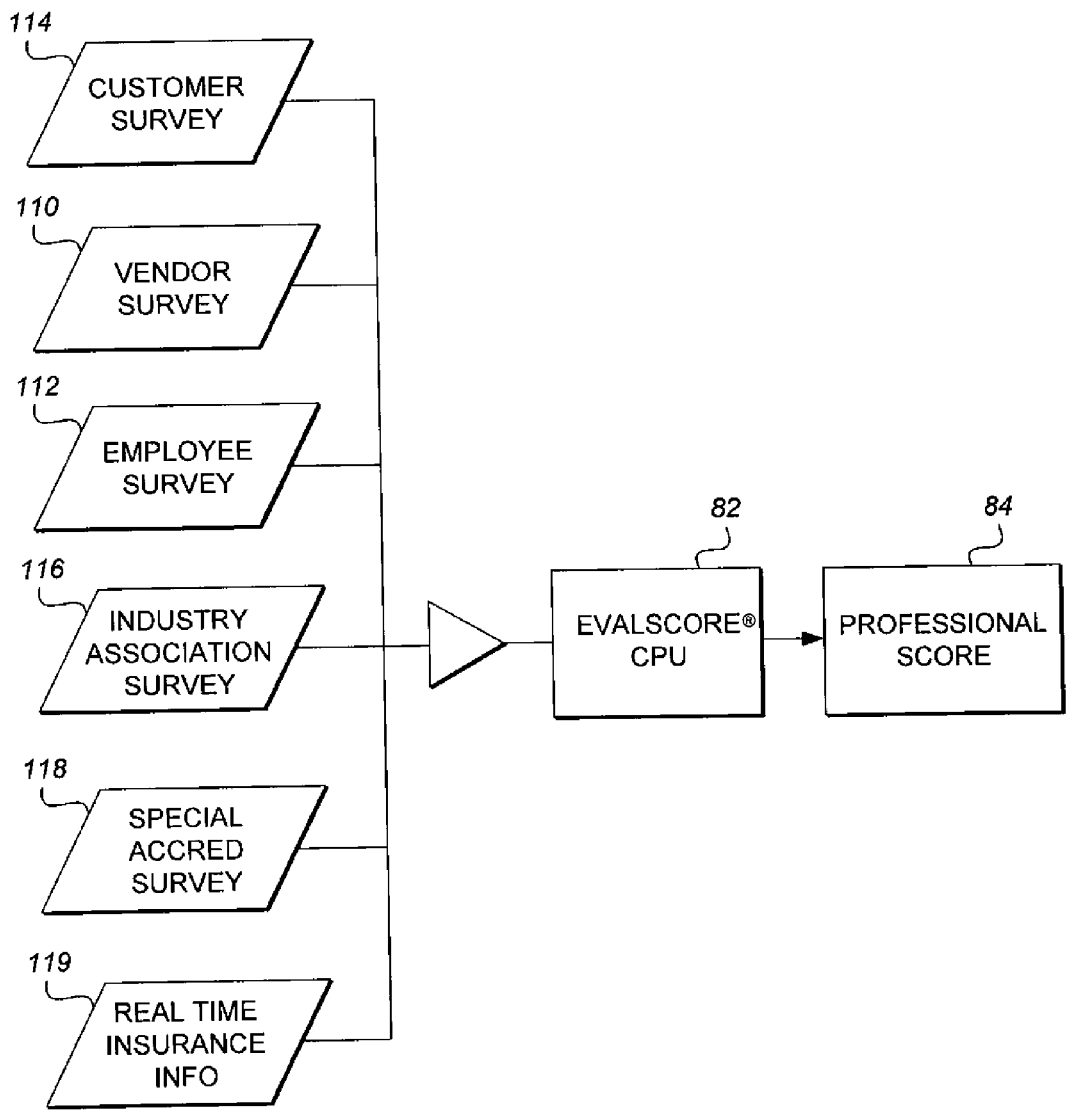
FIG. 5 is a data flowchart of the third embodiment, which is the most preferred embodiment, of an interactive credential system according to the present invention, illustrating the generation of a professional score based on multiple surveys and insurance loss history and account performance.

FIG. 5 is a data flowchart of the third and most preferred embodiment of this disclosure illustrating the generation of a professional score based on multiple surveys. Hence, the data being transmitted to the central processing unit 82 includes real time insurance loss history and account performance information 119, customer surveys 114, vendor surveys 110, association surveys 116, special accreditation surveys 118 and employee surveys 112. A weighted score 84 is generated via the central processing unit 82 as previously described.

Figure 6:
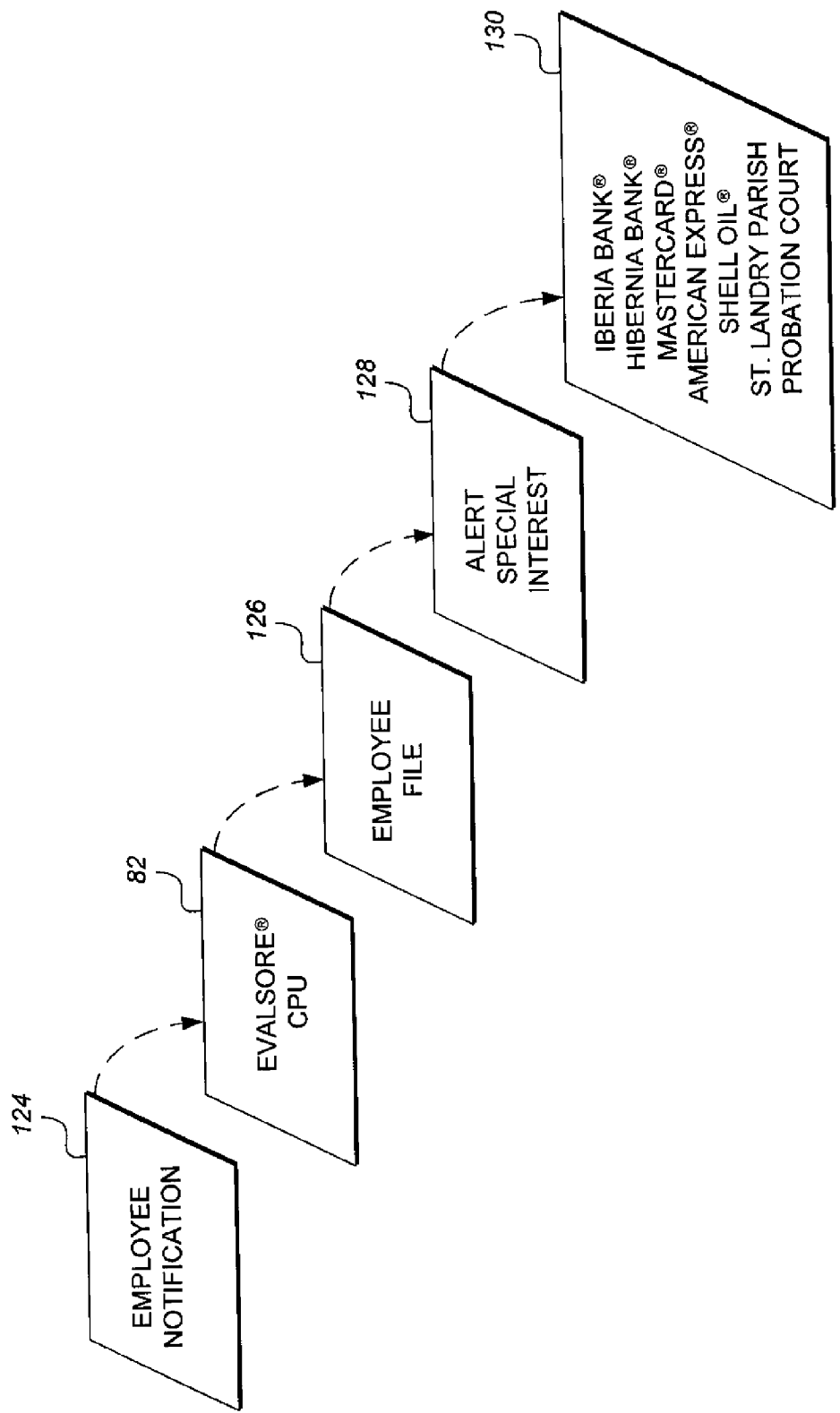
FIG. 6 is a data flowchart of the third embodiment, which is the most preferred embodiment, of an interactive credential system according to the present invention, showing the generation of EVALSCORE® A.L.E.R.T. transmissions to selected participants.

Referring now to FIG. 6, a data flowchart of the third and most preferred embodiment of this disclosure showing the generation of alert transmissions to selected participants, will now be described. An EVALSCORE® A.L.E.R.T. SPECIAL INTEREST PARTY® provision is disclosed to provide instantaneous notification of any significant changes to the employer/employee/applicant file, such as, for example, poor performance, job termination, re-hire, score reduction, etc. The alert function is provided to special interest entities, also referred to as participants, such as insurance companies, licensing boards, banks, credit companies, courts, etc. Special interest entities (participants in this embodiment) will be able to "park" on an applicant's file for change notification alerts. In the most preferred embodiment, a special interest group with authorization of the applicant may monitor the score and conditions of the applicant, where the authorization is granted in part by the payment of an authorization fee.

As illustrated according to the data flow of FIG. 6, and based upon predetermined criteria, once a survey score declines/exceeds a threshold, an employer signal is generated at 124, and this signal notification 124 is transmitted to the central processing unit 82. As an example, XYZ Bank makes a loan to an applicant based upon his "EVALSCORE®" (Employment Strength/Weakness) and Financial Score, based upon existing performance numbers. The bank makes the loan at 8% interest with provisions that the applicant meet or exceed his loan based numbers, and should the applicant's performance cause a decline in the EVALSCORE®, the bank could use this opportunity on a variable loan to increase the loan rate of interest to reflect the increased risk of the applicant. Therefore, at the point of sale, the applicant would execute authority for the bank to "park" on the applicant's file as a SPECIAL INTEREST PARTY® (SIP) for alert notification. The bank could use the same model to reduce the applicant's rate of interest if the score improves. This will give the applicant the incentive to achieve excellence. Additionally, this could also work with insurance companies for increase/decrease in insurance premiums based upon insurance performance; i.e., risk versus reward.

As seen in FIG. 6, the initiation of the signal notification 124 is downloaded and stored in the employee file 126, which, in turn, will generate an alert 128. As per the teachings of this disclosure, the generation of the alert 128 is transmitted to various participants, as seen at 130. The participants will include bank entities, credit entities, court entities, insurance company entities, etc. It should be noted that list is illustrative only. It should be further noted that a change in an EVALSCORE® and/or other conditions which will cause an alert signal to be generated occur in real time, meaning that the EVALSCORE® is constantly updated based upon desired factors, and alerts regarding changes in the EVALSCORE® of interest are sent to the subscribing third parties at the time of the change or update, thus alerting the third parties in real time. It should be understood that data is collected and updated in real time in the preferred embodiment. However, alternatively, the data, or personal information, may be collected and/or updated at any time or based upon a user-selectable set of times or at a user-selectable frequency.

As per the teachings of the present invention, lenders with an interest in the applicant (i.e., the surveyed party) due to loans, credit cards, etc., will be able to receive instant electronic notification of score changes, job changes, etc. Court systems will be able to monitor defendants (i.e., the surveyed party) for probation violations, child support, garnishments, change of job, change of address, etc. Unlike the present conventional method of anticipating a claim, insurance companies will be able to monitor the insured (i.e., the surveyed party), like contractors, for example, and if poor performance trends deteriorate the score of the applicant, insurance companies will be able to issue non-renewals and escape risk or surcharge the premium for the exposure at renewal. General contractors will want to monitor sub-contractors for risk management. If a sub-contractor is receiving consumer complaints that are unresolved, the sub-contractor will realize that it is at risk of losing general contractor's relationship.

Also, if a surveyed party's performance is poor, insurance programs may be non-renewed resulting in the surrender of the relationship. Insurance companies will be able to provide savings to clients via reduced premiums if the party being reviewed (i.e., the party who is being ranked via the survey) maintains an acceptable weighted score. Additionally, licensing boards could participate in the instant notification of weighted scores when, for instance, an entity under license review by the licensing board such as a contractor falls below a predetermined threshold score and places the public at risk. Hence, the license board could choose to non-renew, or provisionally accept, based in part on the weighted scores. Further, company vendors could participate in the SPECIAL INTEREST PARTY® program for instant notification of potential problems with business relationships.

As an example, an insurance company will require a benchmark weighted score for pricing based upon past insurance performance (risk versus reward), where the insurance company will activate the EVALSCORE® A.L.E.R.T. function on a surveyed weighted party file as a SPECIAL INTEREST PARTY®. Therefore, the insurance company can establish parameters for instant notification of motor vehicle operator violations provided by the present inventive method of MVR procurement (as further described in detail below), employment changes, customer complaints of poor performance on commercial risks, misrepresentations, or other established underwriting parameters that will provide the insurance company with decision making criteria to elect to non-renew coverages before unnecessary losses occur, thus saving the insurance company unnecessary claims expense.

Hence, instant notification provides warnings to participants that changes are occurring and action may be needed to protect themselves from loss. The system herein disclosed protects banks and credit companies from financial losses and the recurrence of another sub-prime meltdown due to the internal parameters established for employment performance disclosure, validation, evaluation, assessment with subsequent scoring incorporating real time alert monitoring. The system also protects insurance companies writing commercial insurance from unnecessary claim expense by real time disclosure of score modification and complaint provisions for early intervention and/or issuance of non-renewal or cancellation of poor performing risks. The system protects vendors from declining relationships and protects courts from unnecessary investigative expense in processing garnishments due to the instant notification of employment termination and/or re-employment. Additionally, the system protects general contractors by poor performing sub contractors. The system also protects licensing boards from the renewals of poor performing licensees.

The above methodology is particularly applicable to the insurance and finance industry. Unlike current underwriting tools available, this method may be used for loss predictability based upon real time actual insurance loss experience and scoring assessment encompassing only insurance indicators of each specific risk with the incorporation of interactive performance monitoring in a single database.

Figure 7:
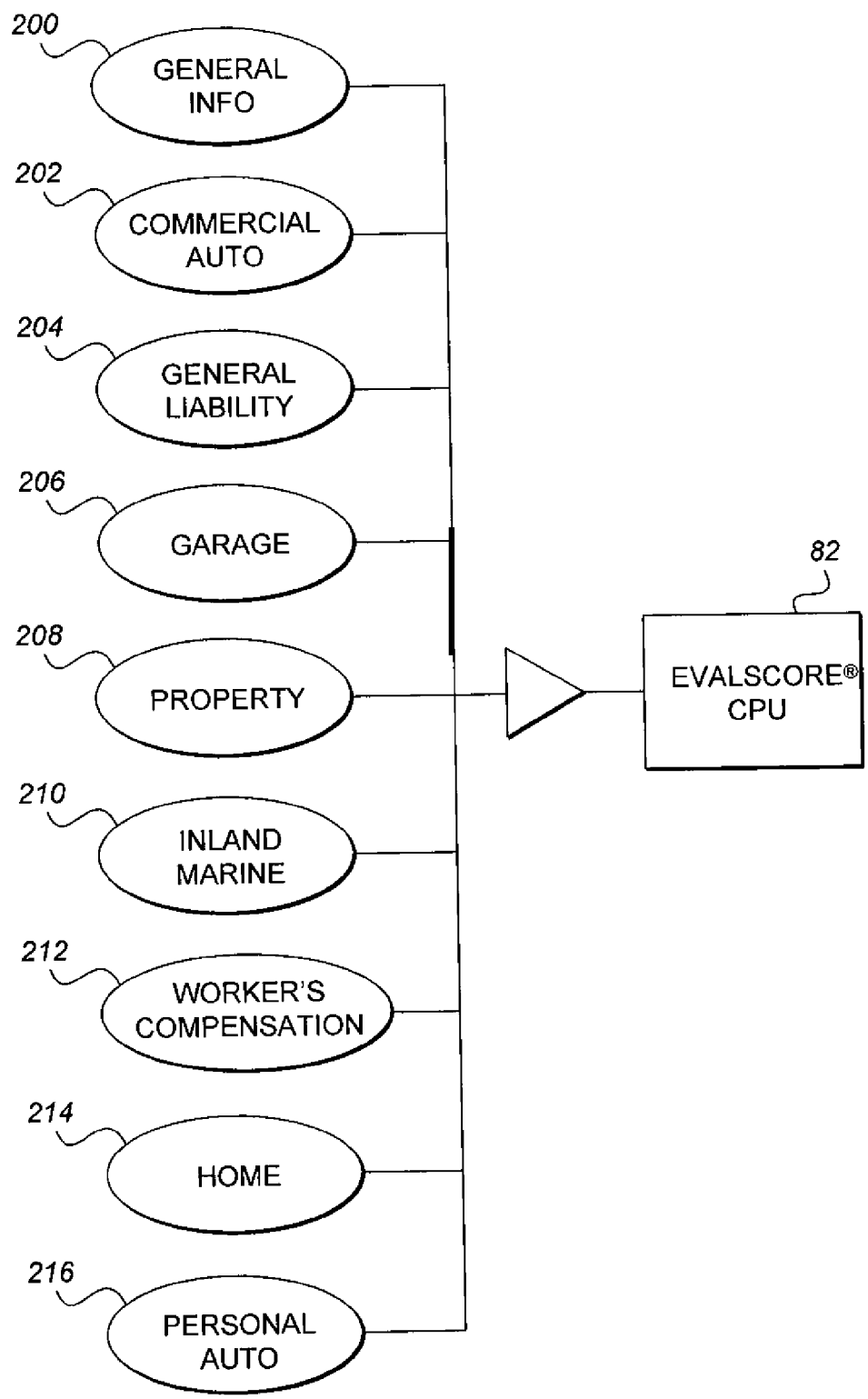
FIG. 7 is a data flowchart illustrating an insurance-specific implementation of the interactive credential system and method according to the present invention.

As shown in FIG. 7, the collection, storage and score assessment of insurance loss experience and performance indicators provided by insurance companies on behalf of insureds can be calculated in a manner similar to that described above, with the collection of general information 200, such as the named insured, policy year, policy number, line of coverage, etc.; along with the insurance specific information, such as commercial auto insurance 202, general liability insurance 204, garage insurance 206, property insurance 208, inland marine insurance 210, workers' compensation 212, home insurance 214 and personal auto insurance 216. It should be understood that this listing is shown for exemplary purposes only, and any insurance-related factors may be used, such as, for example, cargo insurance, umbrella insurance, excess liability insurance, difference in conditions insurance, motor home insurance, recreational vehicle insurance, motorcycle insurance, watercraft insurance, vehicle insurance, commercial insurance and personal insurance, liability fidelity bonds and surety bonds, etc.

Specifically, the mathematical algorithm assessment is applied by CPU 82 for numerical score determination (or a "C.L.A.I.M. Index®") based upon written premiums, earned premiums, incurred losses, paid losses, subrogations/recoverables, loss adjustment expenses and established loss reserves, as well as an Insurance Payment Index (IPI®) computed from actual payment performance indicators of insurance premium payment history, late payment history, policy cancellations, non-renewals, audit payment history, and policy underwriting accuracy and/or misrepresentations, etc. and consumer complaints for commercial risks. It should be understood that this listing of factors is provided for exemplary purposes only.

This method allows for the collection, evaluation, and real time assessment of loss history and insurance performance as provided by insurance company downloads by electronic media; point of sale purchase of loss information by insurers in real time or other authorized parties scored by actual performance experience; nominal fees charged based on years of data, lines of coverage, etc.; and real time performance trend monitoring (or "EVALSCORE OVERSIGHT®") and score modification provided by insurance company downloads to the present system of loss history updates and specific insurance performance indicators such as insurance payment history, non-renewals, cancellations, motor vehicle incident report modifications, etc. A website implementation may incorporate commercial insurance client provisions for electronic alerts created by poor performance indicators filed in the form of complaints directly to insurance companies/the present method by customers of the insured, such as that shown in FIG. 6. These EVALSCORE® A.L.E.R.T.s may provide an opportunity for the insurance company to intervene for dispute resolution prior to economic loss and/or the cancellation or non-renewal of poor performing risks.

With appropriate authorization, customers will have access to the present system for full disclosure and evaluation of their relationship prior to engagement, thus preventing economic loss created by poor workmanship, incomplete work or fraud. The consumer further has the ability to file a meaningful complaint on work performed directly to the insurance company of the insured. Poor performers will have an incentive to provide satisfactory work, as the impact will cost them money in the form of higher insurance premiums or the risk of the insurance program in its entirety.

Figure 9A:
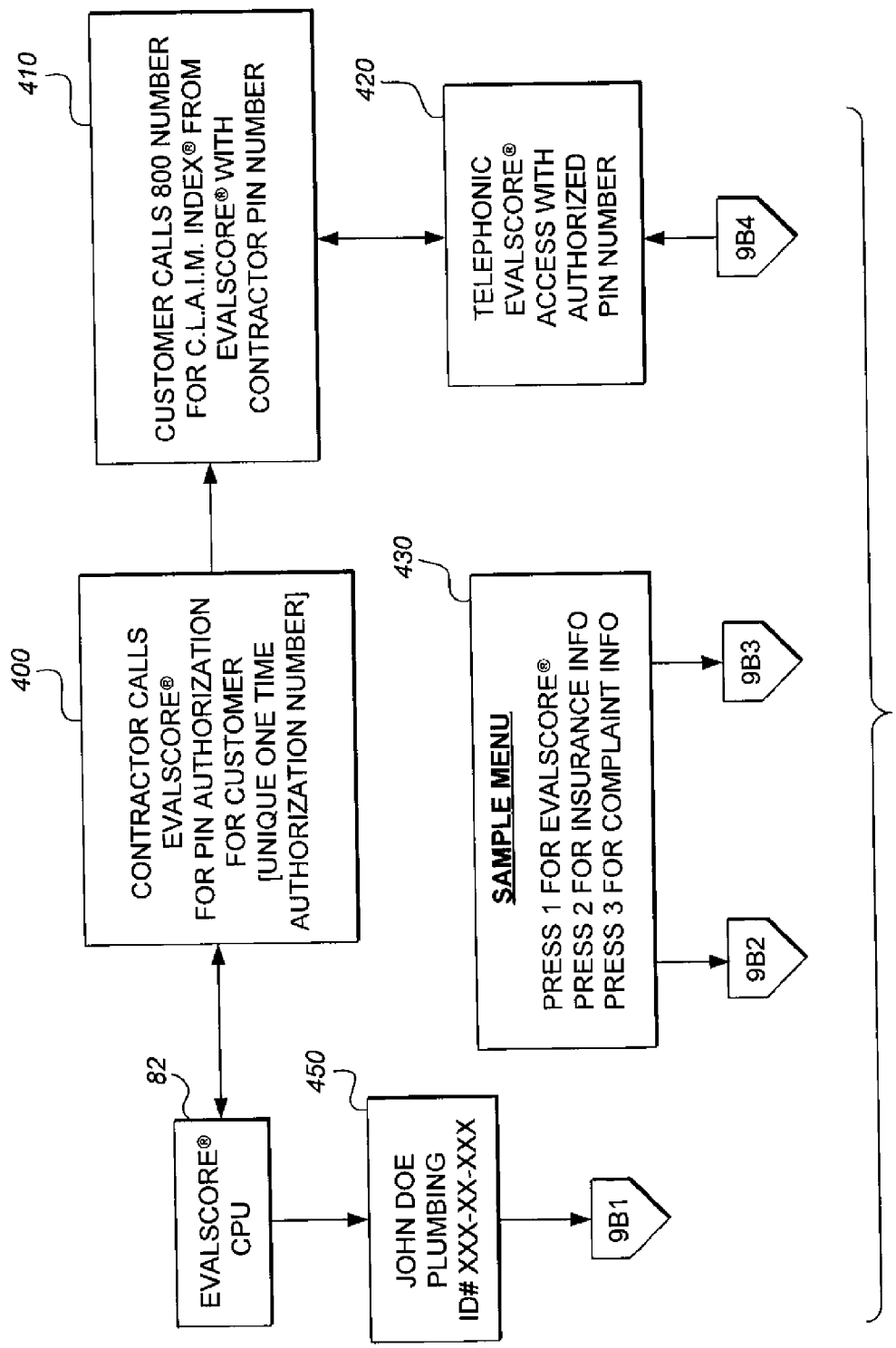
FIGS. 9A, 9B and 9C are a data flowchart illustrating generation of an evaluation report of the interactive credential system and method according to the present invention.
Figure 9B:
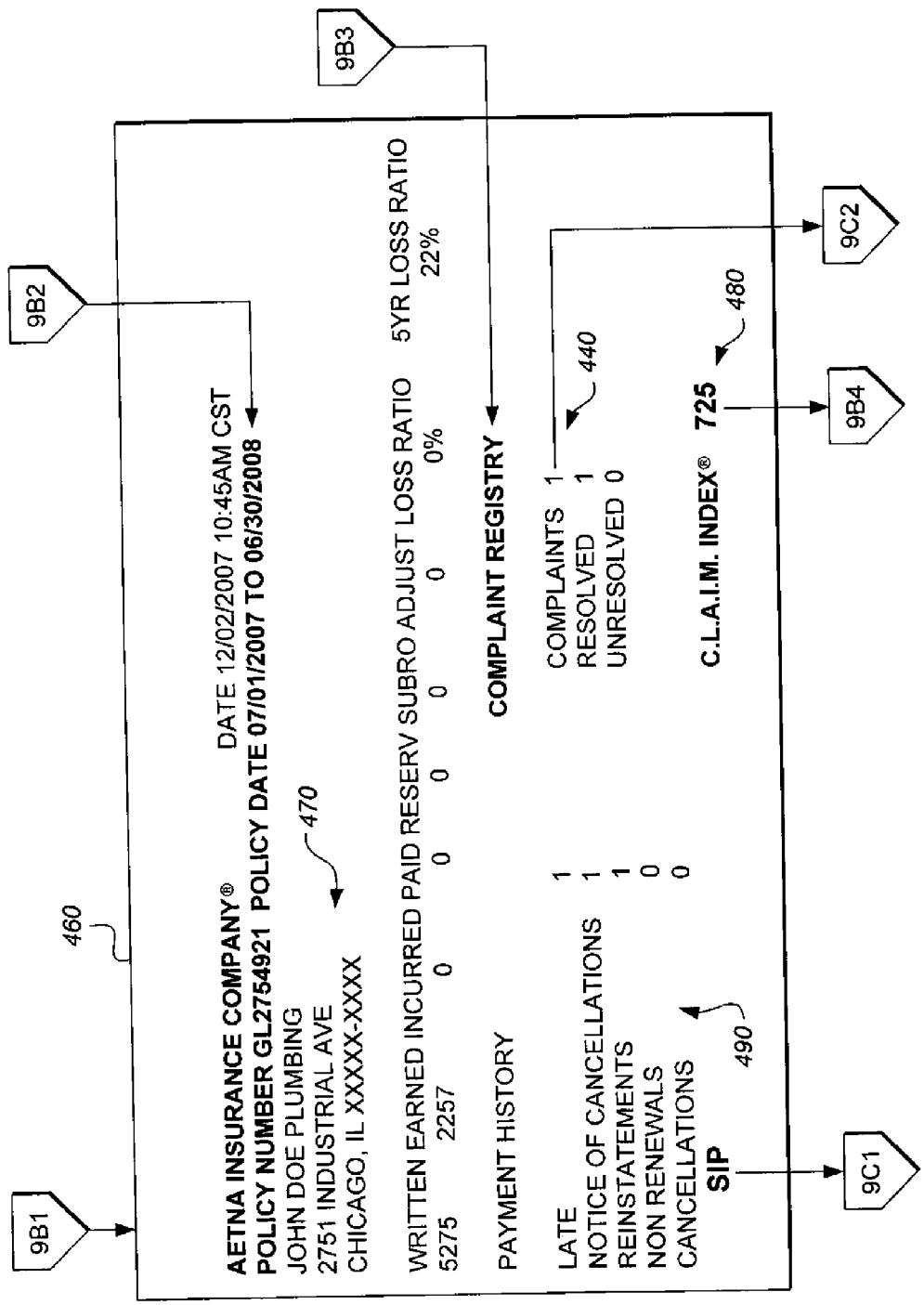
Figure 9C:
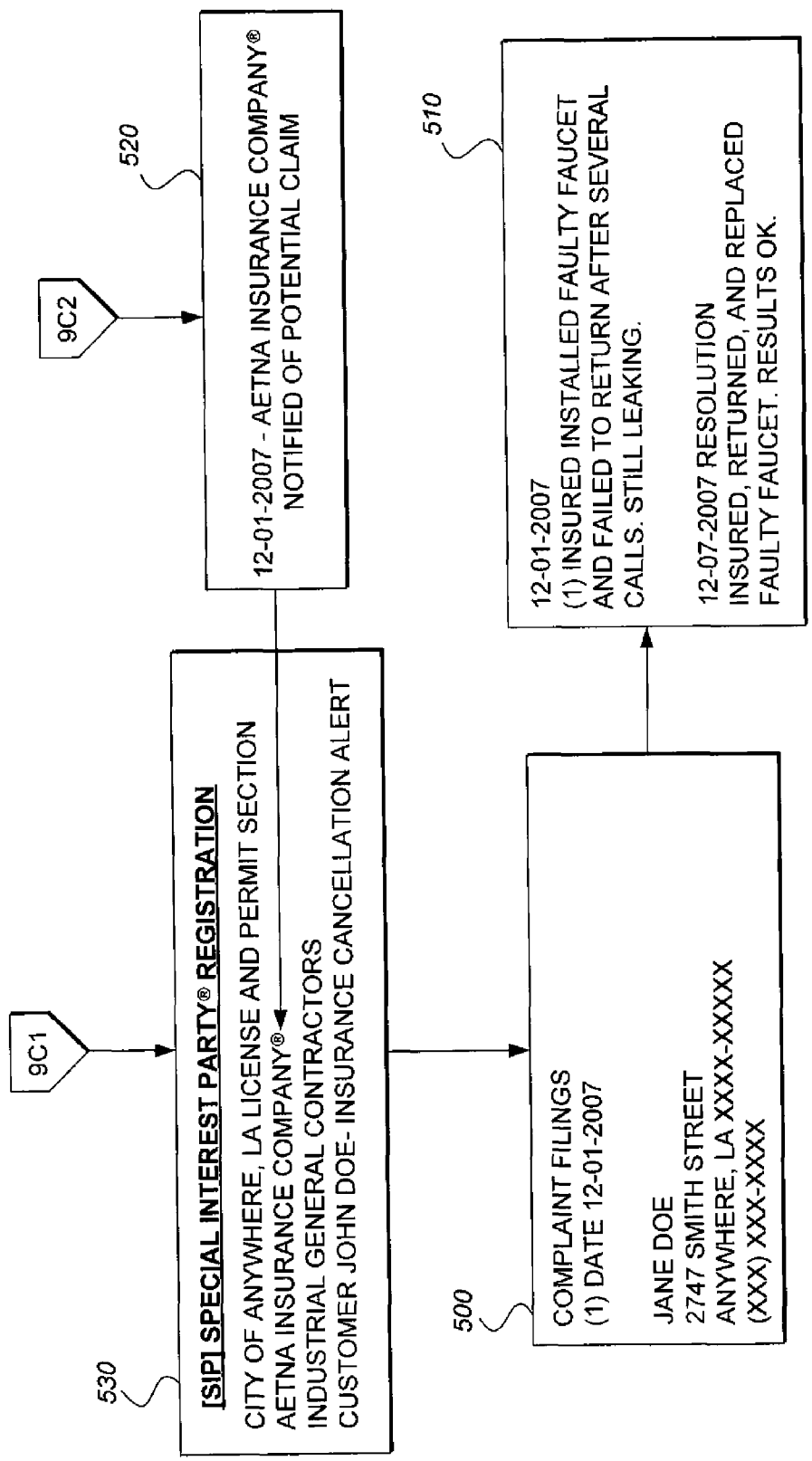

In FIGS. 9A, 9B and 9C, generation of a sample report 460 is illustrated. At step 400, a potential customer contacts the EVALSCORE® system 82 a unique, one-time number for the customer to access the system, acting as a personal identification number (PIN) for accessing the system. As will be described further below, a contractor, for example, calls the EVALSCORE® system for a job order and receives the computer-generated one-time number. The contractor provides this number to the customer for access to his EVALSCORE®. The customer wishes to receive a report on John Doe Plumbing, who is assigned an ID number in the database at 450 for generation of report 460. At 410, the customer calls (which may take place on a toll-free "800" phone number) to receive the evaluation score, is connected at 430 and is offered a menu at 420. The customer may receive the entire "EVALSCORE®" report, insurance-related information or complaint-related information.

The system collates information from SPECIAL INTEREST PARTIES® (SIPs) 530, insurance related information (claim information in this example) 520, and complaint filings against the customer 500 (with a specific, detailed example shown at 510). This information is collated into the report 460, which includes general bibliographic information 470, insurance and SIP evaluations 490, a complaint registry 440, and an overall score 480.

Implementation of the above method will allow insurance companies to save costs and reduce expense ratios through the elimination of the present loss history request and retrieval system, while providing savings from underwriting automation by the aggregation and real time scoring of loss history information eliminating manual manipulation, and savings from the implementation of electronic loss control alerts and monitoring (provided by EVALSCORE OVERSIGHT®). Insurance companies will be able to slot rate insureds after the merging of data based on the present method converted into a reliable numerical assessment aiding automation, thereby reducing underwriting costs. Further, delays in the receipt of loss history of previous insurers are eliminated. The present method requires manual requests in addition to time frame parameters that hinder the transfer of business.

Real time performance trending of insureds is further provided by the present method within the insurance category as provided herein. In addition to real time downloads of loss history changes, the present method provides electronic notification by EVALSCORE OVERSIGHT® to insurers and other interested authorized parties of "hot spots" in commercial insured's performance, in the form of complaints filed by dissatisfied customers and is reflected in the EVALSCORE® Satisfaction Index (ESI). Notification provides the insurance company or authorized party with an opportunity for early intervention prior to loss. As an example, the John Doe Service Company performs work for Chevron USA with a required EVALSCORE® of 600 or better. The John Doe Service Company experiences financial difficulty and many long-time quality employees depart. Work performance deteriorates on other jobs thus decreasing John Doe's score below required threshold, and Chevron USA terminates the relationship prior to economic loss.

In addition to real time downloads of loss history changes, and payment history updates, this system provides for electronic alerts from a proprietary Motor Vehicle Report (MVR) procurement system providing real time MVR incident revision notifications. Unlike existing prior art which provides a method for insurance companies to enter advanced requests with applicable charges for the procurement of MVRs regardless of incident changes prior to renewal for underwriting review, such as policies renewing in June which can be automatically run in April giving the insurer 60 days for review and underwriting action if necessary, this system provides for an interactive model consisting of real time communication with appropriate State Motor Vehicle Divisions or other providers of such reports (as a "SPECIAL INTEREST PARTY®") for instant alerts and MVR procurement. The instant alerts are provided only to this system for those applicants that have experienced negative implications since policy inception, such as, for example, speeding violations, DUI, careless and reckless driving, etc., therefore saving the insurance industry potentially millions of dollars from the purchase of MVRs reflecting "N/R-No Record".

As insurance companies spend millions of dollars annually on the procurement of MVRs for initial policy issuance as well as renewal processing, this method will save the insurance industry millions of dollars as they will only incur charges for MVRs on renewal policies that have experienced negative "change" since policy inception. As an example: ABC Insurance Company purchases MVRs for policy issuance, and if any violations are noted, they are recorded for the chargeable duration of the offense, such as a minor moving violation being 3 years, DUI being 5 years, etc. Therefore, insurers only have an interest in negative implications since inception that will adversely affect risk and resulting score requiring underwriting action, as they know from initial issuance that any existing negative items will "drop off" in time and will be reflected in the revised Motor Vehicle Index (MVI®). This inventive process allows real time additional premium endorsements on violations that occur during the policy period rather than waiting for the policy renewal date to non-renew risk or surcharge premium as per company filings.

Under the current procedures, a negative change mid-term requires the insurer to wait until policy renewal to collect an additional premium, however, if the risk is not worthy of the renewal due to the changes, insurers will not renew the policy. The insurers, however, are disadvantaged by the lack of additional premium for the increased exposure during this remaining policy period. Therefore, with the present inventive process, insurance companies can respond to negative risk in real time processing by the execution of additional premium endorsements providing pro rata charges for the exposure.

This process will also allow return premium endorsements in real time for individuals with violations expiring mid-term, which historically had to be processed at time of renewal, therefore eliminating the discriminatory process of collecting insurance premiums from insureds whose violations are no longer valid. As an example: John Doe's policy period is Jan. 1, 2008 to Jul. 1, 2008, and a three year old speeding violation will expire on Apr. 1, 2008. The present method provides for a return premium endorsement of the surcharged amount from Apr. 1, 2008 to Jul. 1, 2008. Although this method provides for real time endorsements of additional premiums as well as credit endorsements where applicable, the biggest advantage to the industry is cost savings through renewal processing and reduced claims costs by real time MVR notification to insurers of negative events and resulting Motor Vehicle Index (MVI®) score modifications requiring underwriting action.

Figure 8A:
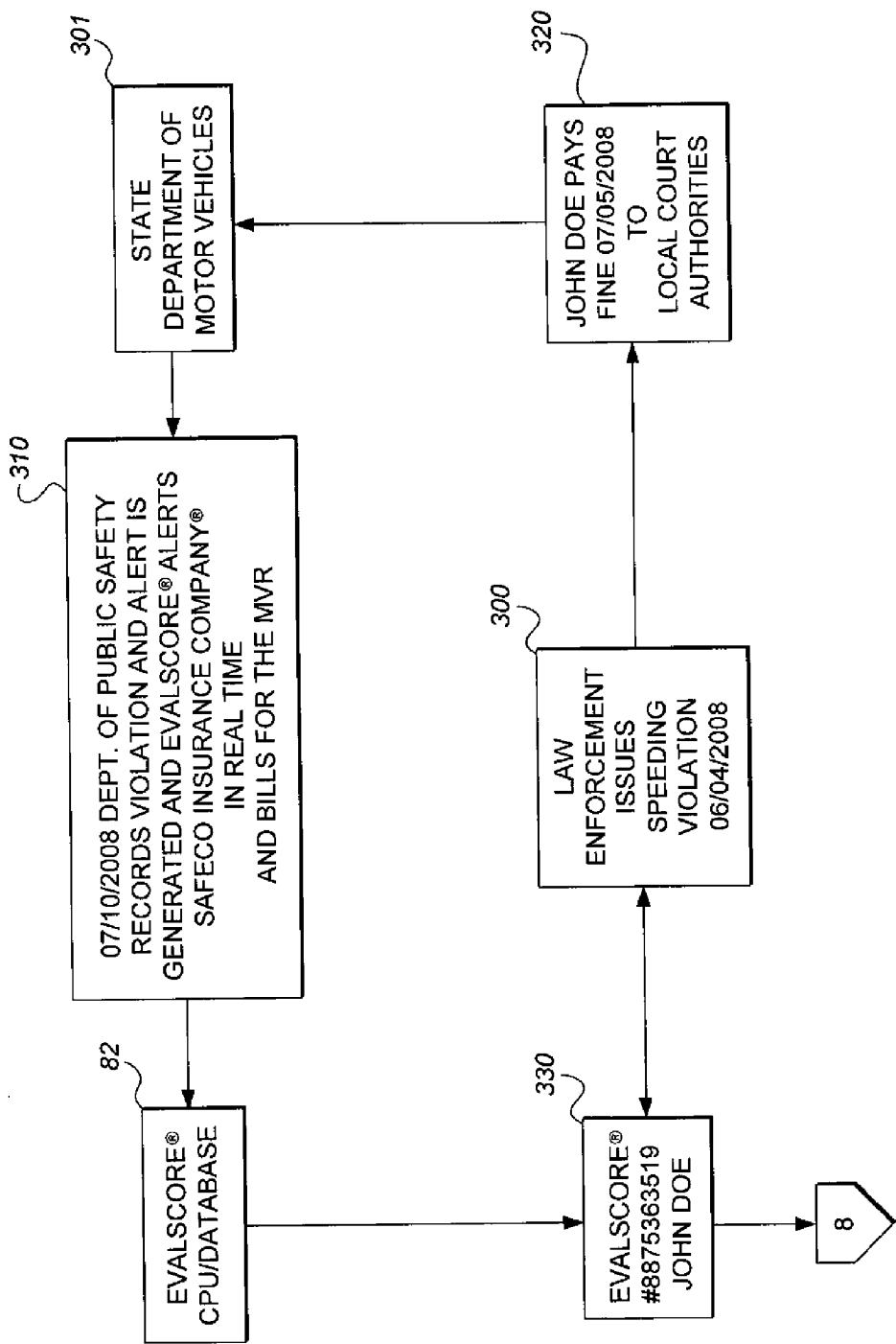
FIGS. 8A and 8B are a data flowchart illustrating generation of an evaluation report of the interactive credential system and method according to the present invention.
Figure 8B:
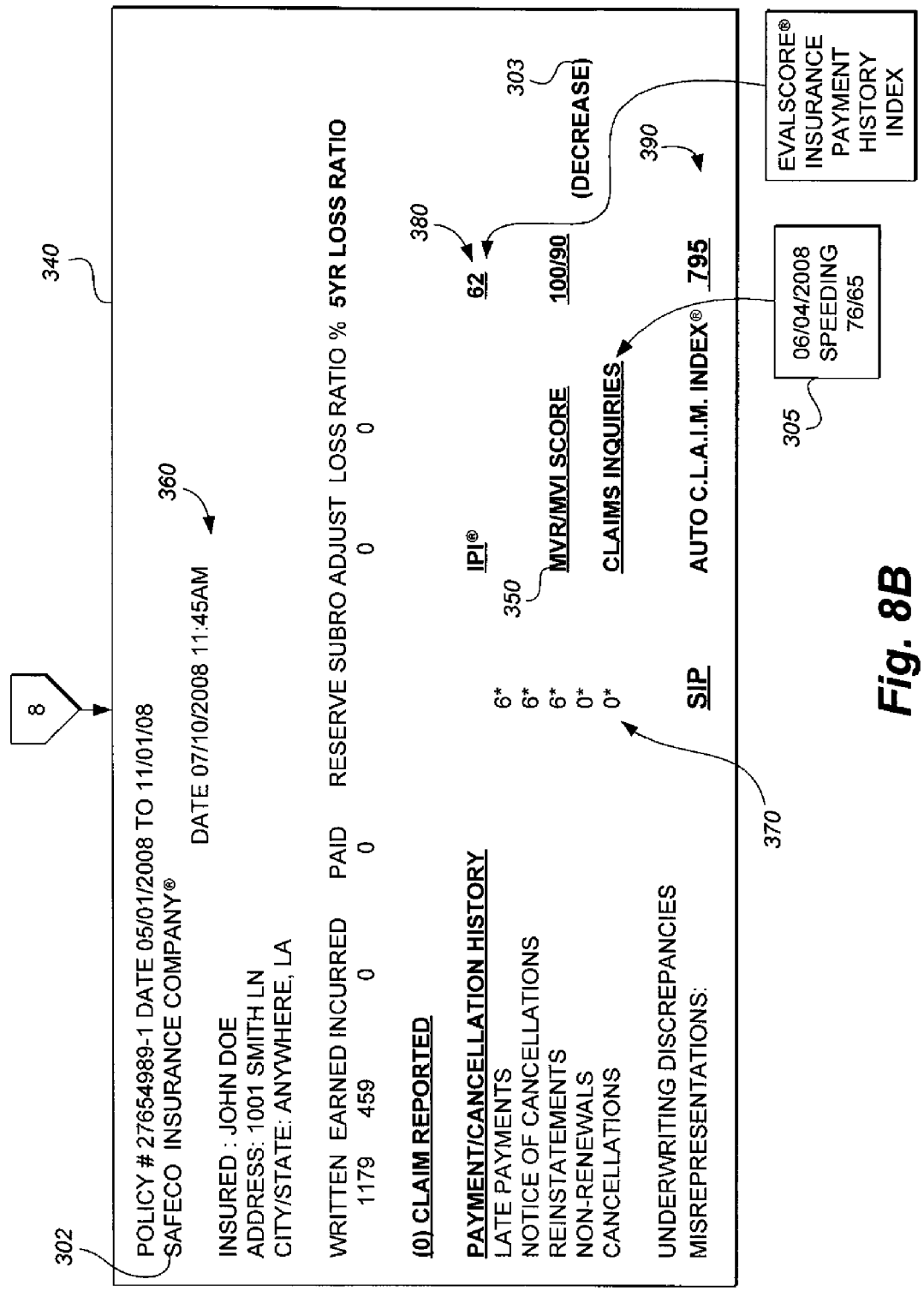

An exemplary MVR application is shown in FIGS. 8A and 8B. At block 300, John Doe is issued a speeding violation on Jun. 4, 2008. In block 320, John Doe pays the fine to the local court authorities on Jul. 5, 2008. The state department of motor vehicles (DMV), represented by block 301, is alerted and an MVR alert conforming with the present inventive method is issued at block 310 and transmitted to the EVALSCORE® CPU 82. The new score is generated by CPU 82 and the information, represented by block 330, is passed both back into the system and into the generation of a report 340 having an updated MVI® score 350 (based on the violation data 305) and showing generalized bibliographic information 360, payment-related information 370, a calculated insurance payment index (IPI®) score 380, and an overall auto insurance score 390 (or "Auto C.L.A.I.M. Index"). It should be noted that after the driver, John Doe, pays the fine at 320, the court system sends the information to the DMV for recordation, which is linked to the general MVR alert 310. That recordation reflects a change in the driving record for John Doe and triggers electronic notification (alert 310) to the EVALSCORE® system for score modification by EVALSCORE® CPU 82. The modified EVALSCORE® is shown in block 330 and serves as a trigger for notification to John Doe's insurer for premium modification in real time. In the example, on Jul. 10, 2008, the EVALSCORE® processor 82 reduces the motor vehicle report index (MVI®) in real time and notifies Safeco Insurance Company of negative change (block 310). On Jul. 10, 2008, Safeco Insurance Company (labeled as 302 in FIG. 8B) sends additional premium endorsement to John Doe for a 5% surcharge for the minor moving violation as per state filings. John Doe's six month premium of $1,179 receives a 5% surcharge of $59.00 computed for pro rata charges of $39.00 for the violation of the Jun. 4, 2008 to Nov. 1, 2008 policy expiration. In FIG. 8B, display segment 303 notes the decrease in score from 1000 to 900 due to the vehicular incident. A visual indicator, such as the exemplary downwardly pointing arrow next to the display segment 303 may further be utilized, as shown.

Additionally, using the previously-described methods above, general contractors also will be able to monitor subcontractors and require minimum scores for bid participation; license and permit Sections can monitor EVALSCORES® for all licensees and receive notification when performance is unacceptable, requiring regulatory action. With specific regard to insurance, the method encourages the insured to achieve satisfaction. With the EVALSCORE® A.L.E.R.T. notification function, insureds will be forced to strive for excellence in order to reduce complaints, thus reducing loss and premium costs.

The present method further allows for the early detection of exposure variances. After the insurer has written the insured and inspected risk, the insured may deviate from the initial exposure and begin tasks that are not warranted in the original rating base. With the electronic alert function (i.e., the EVALSCORE® A.L.E.R.T.), if the insurer receives a complaint on the insured for a scope of work not included in the original application, the insurer has an opportunity to request the cease and desist of the activity or issue notice of cancellation or non-renewal for misrepresentations.

Using the present methodology, the insured will no longer be metaphorically held hostage by current insurers due to the failure to receive previous loss history in a timely fashion in order to bid the insurance program.

As the insurance industry has embraced credit underwriting tools, due to the lack of real time historical loss history performance data, for the underwriting of personal insurance coverages, such as, for example, auto, home, watercraft, etc., many insureds are being penalized by higher insurance premiums due to their late payments or high account balances due to VISA®, MASTERCARD®, home mortgage lenders, etc., as these actions tend to lower credit scores for individuals.

The above inventive method solidifies the basic insurance principal of rating the insured based upon actual insurance experience with actual loss history of the insured in relation to earned premium charges provided by the EVALSCORE® C.L.A.I.M. Index®, as well as sub-scores such as the EVALSCORE® Insurance Payment Index (IPI®) are computed for future loss predictability based upon actual insurance payment performance indicators that have paralleled relevant credit sources, providing an alternative to the current application of third party credit data.

Present systems and methods, such as Choice Point's "CLUE" Comprehensive Loss Underwriting Exchange, for example, do not make reference to premium payments or earned premiums by line of coverage. Instead, they only disclose actual claim payments and do not make reference to reserves, instead only stating conditions as "open" or "closed". An open claim could reflect a reserve of $10,000.00 or $10,000,000.00, for example, thus the information is inconclusive and requires manual manipulation. Choice Point's "CLUE" Comprehensive Loss Underwriting Exchange was designed for the disclosure of "undiscovered" losses of an insured, which was beneficial prior to this real time inventive method. The present real time method eliminates the need for "undisclosed" losses as all claim activity results in real time processing with cross references to items such as drivers license numbers, policy numbers, insurers, etc. for analysis and score modifications. The prior art fails to make reference to premium payments or earned premiums by line of coverage, but most importantly fails to provide an aggregated analysis of prior loss history resulting in a real time numerical score for alert generation and underwriting automation providing cost reductions.

Thus, a "paid claim" of $5,000.00 would have minimal effect on an account that has a $20,000.00 earned premium; i.e. $5000.00/$20,000.00=25% loss ratio. However, if the $5,000.00 payment is made on behalf of an account that generates only $2,600.00 in earned premiums, the resulting loss ratio is 192%. Thus, a great deficiency exists under this system due to the lack of real time aggregated historical data presented in a numerical format, which is solved by the above inventive method.

Unlike that shown in the prior art, the present method takes into consideration years of experience with actual premium payments, written premiums computed for earned premiums vs. actual losses incurred (paid and reserved) with assessment modifications by actual insurance performance indicators, such as late payments, cancellations, non-renewals, underwriting misrepresentations, (non-disclosed drivers, etc.) scored in real time by algorithmic assessment for final score determination. The above method is based on the totality of insurance performance and does not incorporate the possible discriminatory application of non-related performance indicators, such as third party obligations of debt as provided by the "Beacon" credit score presently utilized in the underwriting process. Additionally, the above method contemplates a comprehensive loss aggregation of insurance measurement (or, "C.L.A.I.M. Index®" and IPI®), which may be used as a weighted index such as those described above. Such a C.L.A.I.M. Index®, as with the similar weighted values described herein, is not a final variable of the process for premium determination, but, rather, is a real time insurance performance indicator. Further, as more earned premiums go against losses (if any), the resulting score or C.L.A.I.M. Index® will improve. As these values are monitored by third parties in real time, subscribers will receive alerts regarding the activity. An insurance payment index (or, "IPI®") may work in a similar manner. Any current payment activity (such as payments, delinquencies, etc.) will affect the IPI® (or score) in real time because the index or score is a numerical assessment reflecting performance.

Figure 10:
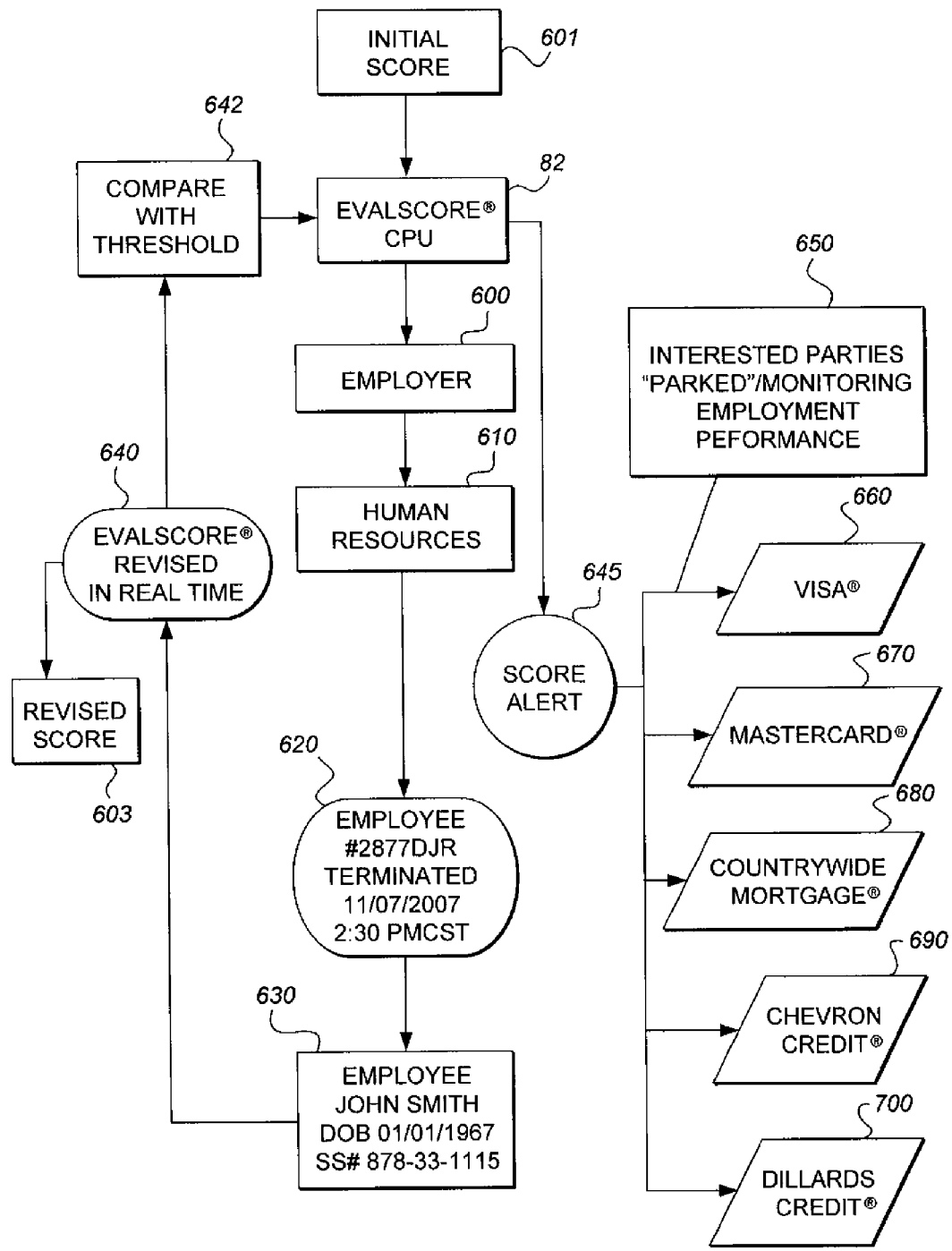
FIG. 10 is a data flowchart illustrating an exemplary implementation of the interactive credential system and method according to the present invention.

Additionally, an employment-related example is illustrated in FIG. 10. Employer 600, which may include a human resources department 610, terminates an employee at 620. The employee's information (at 630) along with the termination information is passed to the EVALSCORE® CPU 82, with a revision in the employee's employment information at 640. At step 642, the revised RiskScore is compared with the threshold or benchmark RiskScore, which, as described above, is established at an earlier time as a user-defined limit or threshold value. As in the above example related to automotive incidents, the employee in the present example has an initial score 601, prior to his termination, and a modified or revised score 603, post-termination. Interested parties, such as VISA® 660, MASTERCARD® 670, a mortgage company 680, creditors 690, 700 and other general interested parties/subscribers 650 automatically receive an alert of the change 645.

As noted above, the present system and method are not limited to the insurance industry, but may be used in any field or industry in which an individual must be evaluated based upon personal information, past performance, credit scores, etc. For example, employers worldwide lack objective performance data on employees, which has resulted in the recent application of "credit" underwriting for the predictability of future employment performance. These employer-accessible "credit" reports are more restrictive in content than the traditional credit report utilized in the credit underwriting industry, and many consumer advocate groups are opposed to the employer-based credit report, due to the possible discriminatory applications. Thus, the present method may further be used to provide an objective employment tool that will serve as a risk management component, aiding both employers and employees in achieving a reduction in claim frequency and severity, thus enhancing our risk management culture.

Similar to the EVALSCORE®, as described above, a weighted employment score (or "RiskScore") may be generated. The employee "RiskScore" is a critical marker for safety measurement and a granular diagnostic tool for employers to isolate poor performers and increase safety education programs. RiskScore may be used to assist OSHA in improving loss time accidents by requiring additional safety/educational programs for all employees who fail to maintain a required "RiskScore" benchmark threshold.

For example, if an employee classification requires an annual certification and/or education renewal, but the employee fails to maintain the required RiskScore threshold for the classification, then he or she could be required to adhere to tighter standards, such as semi-annually, quarterly or monthly reviews for improving employee results, employer performance and insurance company loss ratios, thus contributing to a reduction in insurance premiums through enhanced safety provisions.

This accountability measure will encourage employee behavior modification to improve their RiskScores in order to resume normal safety requirements, as well as serve as a value added component to the employee file. Poor performing employees with a history of loss frequency and employment discourse will now be highlighted to their employers through the transparency of this objective performance scoring system.

The usage of RiskScore will assist employers in enhancing risk management programs for improved claim performance, resulting in increased business, reduced insurance costs and enhanced business profits. For the employee, the "RiskScore" system will provide a catalyst for improving performance scores through behavior modification, thus resulting in a more desirable employee added value, through promotion and increased compensation.

Just as the "employment" industry has incorporated the "credit score" for "employment" underwriting, the "credit industry" will now have an objective performance scoring system as an additional tool for "credit underwriting", due to the payment predictability and transparency of this method. For the workers' compensation insurance company, for example, this provision will reduce loss time accidents and improve the insurance industry by eliminating annual audits through real time processing of employee payroll by classifications for instant premium determination, thereby increasing company cash flows and reducing premium leakage through uncollectible audits. Further, the RiskScore will enhance risk management of individual employees, as their performance will be reflected by the specific performance measurement, providing a tool for the employee to now monitor his or her own performance.

The employment sector is presently impaired by a lack of information on new hires. Companies that hire service contractors may have an "experience modifier" or C.L.A.I.M. INDEX® on the company, however, the company has a risk involved in hiring an employee who was the cause of a deteriorating experience modifier or C.L.A.I.M. INDEX® for his or her previous employer. OSHA logs for the current employer will not reflect this employee experience if the claim was filed by the previous employer. The usage of RiskScore allows this added risk to the employer to be minimized. Although this objective performance scoring is not intended to be a sole remedy for employment, it serves as a process to assist employers in identifying safety deficiencies that may warrant more frequent safety meetings, instruction, etc., thus improving workplace safety.

For the employer, the RiskScore measure will protect fellow employees by minimizing unnecessary injuries caused by a poor performer, will enhance business growth through sound practices, and add asset value to the employer, as they will be more attractive to companies seeking their services.

For the employee, the RiskScore will increase a responsible employee's value through promotion and potential increased compensation, thus providing a tool for rehabilitation of poor performers through performance measurement. For customers, the RiskScore will provide accountability from their relationships, thus reducing business risks and enhancing relationships.

FIGS. 12A and 12B illustrate an exemplary evaluation report 1200 produced by the present method. In this example, EVALSCORE® proprietary data is used to facilitate an additional component, resulting in an employee RiskScore based upon actual employee workers' compensation claim performance which is based upon specific employee classification and payroll, with a workers' compensation premium assessment rate per $100 of payroll and insurance loss history, with noted offsets for non-fault incidents, including third party causation and workers compensation subrogation claims.

As described above, the EVALSCORE® database contains specific employer claim performance through the C.L.A.I.M. INDEX®, resulting from the data aggregation of earned premiums vs. incurred losses, and in the example of FIGS. 12A and 12B, EVALSCORE® further provides an employee RiskScore assessment by a similar method.

The employer's rating base for workers' compensation is a combination of applications of several class codes for specific hazards of job descriptions and the payroll of each employee, multiplied by the appropriate rate per $100.00 of payroll (or through special exemption).

In the exemplary evaluation report 1200 of FIGS. 12A and 12B, the employer 1202 is "Ace Plumbing" has a C.L.A.I.M. INDEX® 1204 of 727, a total annualized payroll 1204 of $213,218.00, with an annualized workers compensation insurance premium 1206 of $9,275 based upon class code 1208 "Plumbing NOC" with a rate 1210 of $4.35 per $100 of payroll (or, $213,218.00/100×$4.35=$9,275).

If employee John Smith has an annual compensation 1212 of $45,000.00, then his resulting premium assessment 1214 to his employer for his position would be $1,958.00 per year ($45,000.00/100×$4.35). With his specific premium information, the EVALSCORE® system would be able to track his losses against his earned premium over a historical period, such as 5 to 7 years, for example, for the RiskScore determination 1216.

It is to be understood that the present invention is not limited to the embodiments described above, but encompasses any and all embodiments within the scope of the following claims.

I claim:

1. A computerized method of aggregating, scoring, and distributing information on an entity in real time comprising the steps of:

establishing a network interface between a central server, at least one remote data collection terminal and at least one authorized third party terminal, the central server having computer readable memory associated therewith;

receiving information on an entity from the at least one remote data collection terminal, wherein the information includes the entity's real time insurance-related information selected from the group consisting of: insurance premium and insurance loss history, insurance payment history, non-renewal history, cancellations of insurance, motor vehicle reports and prior misrepresentations and combinations thereof, wherein the real time insurance premium and insurance loss history further includes information selected from the group consisting of: information related to prior employment of the individual, information related to commercial auto insurance, general liability insurance, garage insurance, property insurance, inland marine insurance, workers' compensation, wherein the workers' compensation is determined using a real time measurement of the employee's insurance performance within a workers compensation insurance program, including the computation of at least one of the specific employee's earned premium development and incurred loss information and an employee modifier comparing employee performance to an industry performance result, health insurance, home insurance, personal auto insurance, cargo insurance, umbrella insurance, excess liability insurance, difference in conditions insurance, motor home insurance, recreational vehicle insurance, motorcycle insurance, watercraft insurance, vehicle insurance, commercial insurance, personal insurance, liability fidelity bonds and surety bonds;

storing the information in a database stored in the computer readable memory;

updating the information upon a change therein;

calculating a single weighted score by aggregation of a plurality of separate selected factors of the information, wherein at least one of the selected factors includes workers' compensation, the single weighted score represents a risk measure of an entity's real time insurance-related information, the calculation of the single weighted score being performed by a processor of the central server;

storing the single weighted score in the computer readable memory;

updating the single weighted score upon an updated change in the information on the entity;

transmitting authorization data to view the information and the single weighted score from the at least one authorized third party terminal to the server;

authenticating and authorizing the at least one third parties' access to the database;

displaying the information and the single weighted score to the at least one third party;

continuously monitoring the database for a change in at least one third party-selected factor;

transmitting an alert signal to the at least one third party terminal upon detection of a change in the at least one third party selected factor; and transmitting the single weighted score to the at least one third party and monitoring behavior modification and its risk management impact on the single weighted score.

2. The computerized method of aggregating, scoring, and distributing information on an entity as recited in claim 1, wherein the step of requesting authorization to download the information and the at least one weighted score includes paying a request fee by the at least one third party in order to view the real time insurance loss history and account performance information and the at least one weighted score.

3. The computerized method of aggregating, scoring, and distributing information on an entity as recited in claim 2, further comprising the step of transmitting authorization data to update the personal information from the at least one remote data collection terminal to the server.

4. The computerized method of aggregating, scoring, and distributing information on an entity as recited in claim 1, wherein said information is sub-divided into categories including prior claim performance, prior customer satisfaction, insurance payment history, motor vehicle report history, insurance premium size, insurance policy duration and prior complaint filings.

5. The computerized method of aggregating, scoring, and distributing information on an entity as recited in claim 1, wherein the entity is an individual.

6. The computerized method of aggregating, scoring, and distributing information on an entity as recited in claim 5, wherein the individual is an insurance policyholder and the information is policyholder information.

7. The method of claim 1, wherein a motor vehicle report includes at least one of citations, criminal violations, and civil violations from at least one of a state department of motor vehicles and a third party.

8. The computerized method of aggregating, scoring, and distributing information on an entity as recited in claim 1, wherein the risk measure of an entity's real time insurance-related information further includes a real time measurement of insurance performance on rate basis.

\* \* \* \* \*